United States Patent
Kim et al.

(10) Patent No.: US 12,095,672 B2
(45) Date of Patent: Sep. 17, 2024

(54) METHOD AND APPARATUS FOR PROCESSING DATA IN WIRELESS COMMUNICATION SYSTEM

(71) Applicant: Samsung Electronics Co., Ltd., Gyeonggi-do (KR)

(72) Inventors: Donggun Kim, Seoul (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 372 days.

(21) Appl. No.: 17/397,191

(22) Filed: Aug. 9, 2021

(65) Prior Publication Data

US 2021/0367899 A1  Nov. 25, 2021

Related U.S. Application Data

(63) Continuation of application No. 15/872,398, filed on Jan. 16, 2018, now Pat. No. 11,088,958.

(30) Foreign Application Priority Data

Jan. 16, 2017  (KR) .................. 10-2017-0007159

(51) Int. Cl.
*H04L 47/34* (2022.01)
*H04L 1/18* (2023.01)
(Continued)

(52) U.S. Cl.
CPC .............. *H04L 47/34* (2013.01); *H04L 45/74* (2013.01); *H04W 4/70* (2018.02); *H04W 12/033* (2021.01);
(Continued)

(58) Field of Classification Search
None
See application file for complete search history.

(56) References Cited

U.S. PATENT DOCUMENTS

| 10,524,111 B2 | 12/2019 | Loehr |
| 2004/0033801 A1 | 2/2004 | Yi |

(Continued)

FOREIGN PATENT DOCUMENTS

| CN | 101911546 | 12/2010 |
| EP | 2 073 588 | 6/2009 |
| KR | 1020100076866 | 7/2010 |

OTHER PUBLICATIONS

Samsung, "RLC Out of Sequence Delivery?", R2-080170, 3GPP TSG-RAN2 Meeting #60bis, Jan. 14-18, 2008, 3 pages.
(Continued)

*Primary Examiner* — Kenny S Lin
*Assistant Examiner* — Rodrick Mak
(74) *Attorney, Agent, or Firm* — The Farrell Law Firm, P.C.

(57) ABSTRACT

A terminal and a method are provided. A radio link control (RLC) packet data unit (PDU) associated with a bearer is received. It is identified whether an RLC service data unit (SDU) obtained from the RLC PDU is complete or a segment. In case that an out of order delivery is configured for an RLC entity associated with the bearer, and that the first RLC SDU is complete, a first RLC SDU acquired from the RLC PDU is transferred from the RLC entity to a packet data convergence protocol (PDCP) entity regardless of an order of a sequence number of the RLC PDU. A reordering function is performed based on a PDCP PDU obtained from the first RLC SDU, in case that the PDCP entity is associated with the RLC entity configured with the out of order delivery. Another RLC PDU associated with the bearer is received.

18 Claims, 17 Drawing Sheets

(51) Int. Cl.
*H04L 45/74* (2022.01)
*H04W 4/70* (2018.01)
*H04W 12/033* (2021.01)
*H04W 12/12* (2021.01)
*H04W 28/06* (2009.01)
*H04W 80/02* (2009.01)

(52) U.S. Cl.
CPC ........... *H04W 12/12* (2013.01); *H04W 28/06* (2013.01); *H04W 80/02* (2013.01); *H04L 1/18* (2013.01)

(56) References Cited

U.S. PATENT DOCUMENTS

| | | | |
|---|---|---|---|
| 2009/0003283 | A1 | 1/2009 | Meylan |
| 2009/0034476 | A1 | 2/2009 | Wang et al. |
| 2009/0190554 | A1 | 7/2009 | Cho |
| 2009/0219951 | A1 | 9/2009 | Chun et al. |
| 2010/0165937 | A1 | 7/2010 | Yi et al. |
| 2010/0167746 | A1 | 7/2010 | Lee |
| 2010/0274921 | A1 | 10/2010 | Lerzer et al. |
| 2010/0325393 | A1 | 12/2010 | Lerzer |
| 2012/0155438 | A1 | 6/2012 | Shin |
| 2013/0242859 | A1 | 9/2013 | Celik et al. |
| 2014/0293903 | A1 | 10/2014 | Kuo |
| 2014/0321263 | A1 | 10/2014 | Wu |
| 2015/0257078 | A1 | 9/2015 | Cho |
| 2016/0044639 | A1 | 2/2016 | Yi et al. |
| 2016/0113058 | A1 | 4/2016 | Jung et al. |
| 2017/0111754 | A1 | 4/2017 | Baghel |
| 2017/0207884 | A1 | 7/2017 | Jiang |
| 2017/0310421 | A1 | 10/2017 | Olsson |
| 2018/0317130 | A1 | 11/2018 | Jin |
| 2018/0343584 | A1 | 11/2018 | Yi |
| 2018/0376488 | A1* | 12/2018 | Han .................... H04W 72/569 |
| 2019/0053325 | A1 | 2/2019 | Yu |
| 2019/0230667 | A1 | 7/2019 | Loehr |
| 2019/0230736 | A1 | 7/2019 | Quan |
| 2019/0289496 | A1 | 9/2019 | Shim |
| 2020/0077300 | A1 | 3/2020 | Xu |
| 2020/0245400 | A1 | 7/2020 | Zheng |
| 2020/0374237 | A1* | 11/2020 | Li .................... H04W 28/0252 |
| 2021/0306913 | A1* | 9/2021 | Li .......................... H04W 76/11 |

OTHER PUBLICATIONS

Chinese Office Action dated Mar. 11, 2022 issued in counterpart application No. 201880006976.6, 7 pages.
International Search Report dated Apr. 26, 2018 issued in counterpart application No. PCT/KR2018/000760, 9 pages.
Intel Corporation, Report of Email Discussion: [95#27][LTE/NR] Reordering (Intel), R2-166883, 3GPP TSG-RAN WG2 Meeting #95bis, Oct. 10-14, 2016, 18 pages.
MediaTek Inc., "User Plane Enhancements for TCP Performance", R2-1700191, 3GPP TSG-RAN WG2 NR, Jan. 17-19, 2017, 3 pages.
European Search Report dated Oct. 8, 2019 issued in counterpart application No. 18739277.4-1213, 8 pages.
European Search Report dated Feb. 25, 2020 issued in counterpart application No. 18739277.4-1213, 7 pages.
Panasonic, "User Plane Architecture and High Level Layer 2 Functions", R2-166110, 3GPP TSG-RAN WG2 Meeting #95-bis, Oct. 10-14, 2016, 3 pages.
European Search Report dated Jul. 13, 2020 issued in counterpart application No. 18739277.4-1213, 8 pages.
Korean Office Action dated Jul. 20, 2022 issued in counterpart application No. 10-2017-0007159, 8 pages.
Indian Hearing Notice dated Feb. 5, 2024 issued in counterpart application No. 201937028193, 3 pages.
Chinese Office Action dated Aug. 4, 2021 issued in counterpart application No. CN 201880006976.6, 11 pages.

* cited by examiner

METHOD AND APPARATUS FOR PROCESSING DATA IN WIRELESS COMMUNICATION SYSTEM

PRIORITY

This application is a Continuation Application of U.S. patent application Ser. No. 15/872,398, filed in the U.S. Patent and Trademark Office on Jan. 16, 2018, which claims priority under 35 U.S.C. § 119(a) to a Korean Patent Application filed on Jan. 16, 2017 in the Korean Intellectual Property Office and assigned Ser. No. 10-2017-0007159, the entire disclosure of which is incorporated herein by reference.

BACKGROUND

1. Field of the Disclosure

The present disclosure relates to a method and an apparatus for processing data in a wireless communication system, and more particularly, to an out-of-sequence deciphering method that accelerates data processing of a terminal and an apparatus for performing the method in a mobile communication system.

2. Description of the Related Art

To meet the demand for wireless data traffic which has increased since the deployment of fourth generation (4G) communication systems, efforts have been made to develop an improved fifth generation (5G) or pre-5G communication system. Therefore, a 5G or pre-5G communication system is also referred to as a "beyond 4G network" or a "post long term evolution (LTE) system." A 5G communication system is considered to be implemented in higher frequency (mm-Wave) bands, e.g., 60 GHz bands, so as to accomplish higher data rates. To decrease propagation loss of radio waves and increase transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In a 5G system, hybrid frequency-shift keying (FSK) and quadrature amplitude modulation (QAM) modulation (EQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, machine-to-machine (M2M) communication, machine type communication (MTC), and so forth have recently been studied. Such an IoT environment may provide intelligent Internet technology services that create new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

On the other hand, in the next-generation communication system, various discussions for improving data processing speed have been required.

SUMMARY

An aspect of the present disclosure is to improve data processing of a terminal, in order to support services that require a high data rate and a low latency response time in a mobile communication system (e.g., an LTE or an LTE advanced (LTE-A) system).

Another aspect of the present disclosure is to provide a next-generation mobile communication system that supports a maximum data rate of 20 Gbps in a downlink and a maximum data rate of 10 Gbps in an uplink, and require a very short latency response time.

Another aspect of the present disclosure is to improve the data processing so as to be efficiently optimized in a case of a terminal currently receiving a service in a mobile communication system.

Another aspect of the present disclosure is to provide a method for accelerating the data processing for fast processing of data being transmitted and received in a case of a terminal to receive a service in a next-generation mobile communication system.

Another aspect of the present disclosure is to provide an out-of-sequence deciphering method to accelerate data processing of a terminal and an apparatus for performing the out-of-sequence deciphering method in a mobile communication system, Another aspect of the present disclosure is to provide an out-of-sequence deciphering method for accelerating data processing of a terminal to improve data processing speed of the terminal in a current mobile communication system and to enable a terminal for a next-generation mobile communication system to stably receive high-speed and high-quality services having a high throughput and a low latency.

Another aspect of the present disclosure is to provide a terminal that can process data at a high speed when receiving and processing the data.

In accordance with an aspect of the present disclosure, a method performed by a terminal is provided. A radio link control (RLC) packet data unit (PDU) associated with a bearer is received. It is identified whether an RLC service data unit (SDU) obtained from the RLC PDU is a complete RLC SDU or a segment of the complete RLC SDU. In case that an out of order delivery is configured for an RLC entity associated with the bearer, as a response to determining that the first RLC SDU is identified as the complete RLC SDU, a first RLC SDU acquired from the RLC PDU is transferred from the RLC entity to a packet data convergence protocol (PDCP) entity regardless of an order of a sequence number of the RLC PDU. A reordering function is performed based on a PDCP PDU obtained from the first RLC SDU, in case that the PDCP entity is associated with the RLC entity configured with the out of order delivery. Another RLC PDU associated with the bearer is received.

In accordance with another aspect of the present disclosure, a terminal is provided that includes a transceiver and a controller coupled with the transceiver. The controller is configured to receive an RLC PDU associated with a bearer. The controller identifies whether an RLC SDU obtained from the RLC PDU is a complete RLC SDU or a segment of the complete RLC SUD. In case that an out of order delivery is configured for an RLC entity associated with the bearer, as a response to determining that the first RLC SDU is identified as the complete RL SDU, the controller transfers a first RLC SDU acquired from the RLC PDU from the RLC entity to a PDCP entity regardless of an order of a sequence number of the RLC PDU. The controller performs a reordering function based on a PDCP PDU obtained from the first RLC SDU, in case that the PDCP entity is associated with the RLC entity a configured with the out of order delivery. The controller receives another RLC PDU associated with the bearer.

BRIEF DESCRIPTION OF THE DRAWINGS

The above and other aspects, features, and advantages of embodiments of the present disclosure rill be more apparent from the following description taken in conjunction with the accompanying drawings, in which.

DETAILED DESCRIPTION

Figure 1:
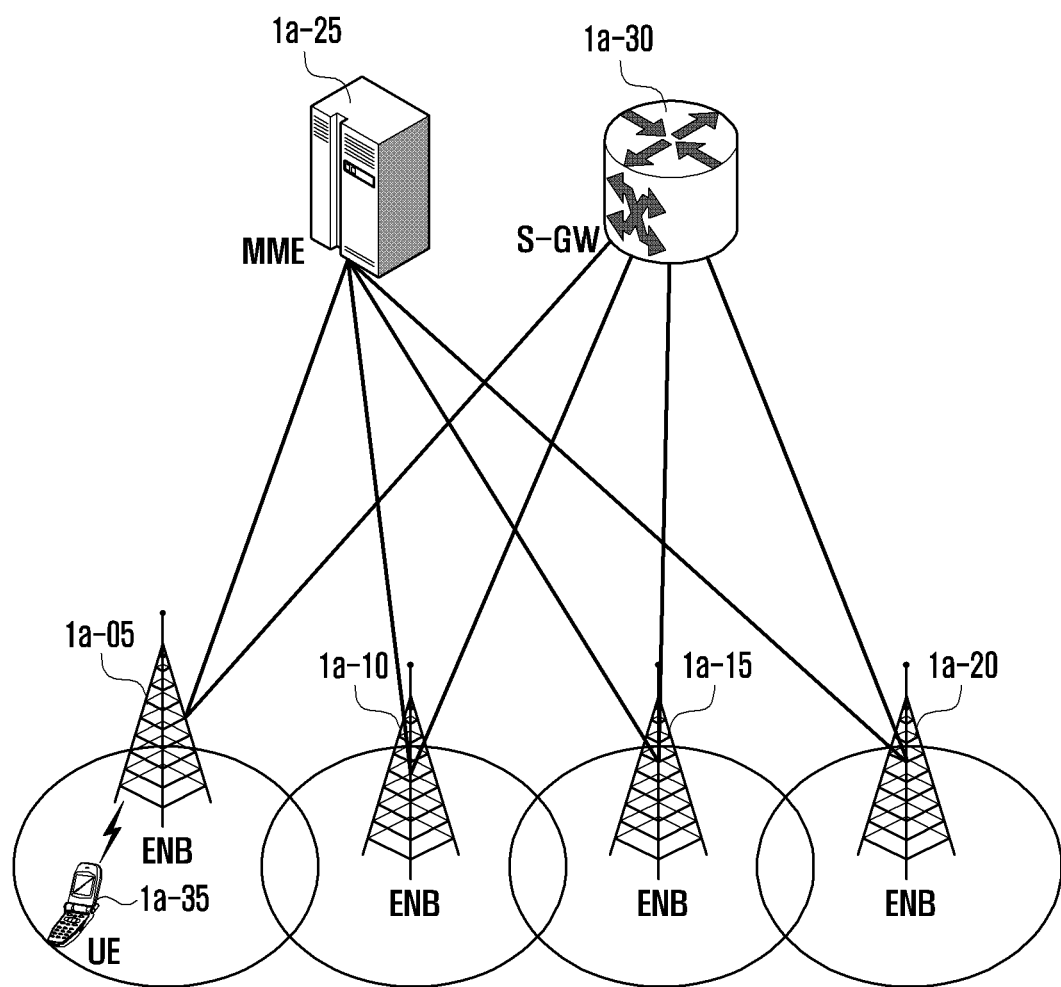
FIG. 1 is a diagram of an LTE system.

Hereinafter, the operation principle of the present disclosure is described in detail with reference to the accompanying drawings. In describing the present disclosure, related well-known functions or configurations incorporated herein are not described in detail in a case where unnecessary detail would obscure the subject matter of the present disclosure. Further, terms described below are terms defined in consideration of their functions in the present disclosure, but may differ depending on intentions of a user, an operator or customs. Accordingly, the terms are intended to be defined based on the description of the present disclosure.

Hereinafter, embodiments of the present disclosure are described with reference to the accompanying drawings.

Hereinafter, examples of terms for identifying a connection node, calling network entities, calling an interface between network entities, and calling various pieces of identification information are described. However, it is not intended that the present disclosure be limited to the terms described below, but other terms for calling subjects having equivalent meanings may be used.

Hereinafter, terms and titles that are defined in the $3^{rd}$ generation partnership project long term evolution (3GPP LTE) standards are used. However, it is not intended that the present disclosure be limited by the terms and titles, but that the present disclosure may be equally applied to systems following other standards, such as 5G and new radio (NR) systems.

In an embodiment of the present disclosure, a PDCP layer may be a logical layer or a device configuration that performs an operation of the PDCP layer. An RLC layer may be a logical layer or a device configuration that performs an operation of the RLC layer. A medium access control (MAC) layer may be a logical layer or a device configuration that performs an operation of the MAC layer. A physical (PHY) layer may be a logical layer or a device configuration that performs an operation of the PHY layer. Separate physical devices corresponding to the respective layers may exist, and the operations of the respective layers may be controlled by at least one device (e.g., a controller of a transmission device).

In an embodiment of the present disclosure, a device that performs a PDCP layer operation may be referred to as a PDCP device, and a device that performs an RLC layer operation may be referred to as an RLC device. Further, a device that performs a MAC layer operation may be referred to as a MAC device.

An embodiment of the present disclosure may be applied to a reception device of an LTE system or a next-generation communication system (e.g., a 5G or an NR system), A reception device may include a terminal or a base station. A terminal may be an NR terminal, and a base station may be an NR base station. Below, an example of a terminal is a reception device. However, it is not intended that the present disclosure be limited to a terminal, but the present disclosure may be applied to the operation of a base station.

A device that performs an RLC layer operation may receive an RLC PDL from a device that performs a MAC layer operation. An RLC PDU may be composed of an RLC header and an RLC SDU. A device that performs an RLC layer operation may transfer an RLC SDU to a device that performs a PDCP layer operation. The expression "a device that performs an RLC layer operation transfers an RLC PDU to a device that performs an PDCP layer operation" may be construed as a transfer of an RLC SDU corresponding to an RLC PDU.

FIG. 1 is a diagram of an LTE system.

Referring to FIG. 1, a RAN of an LTE system is composed of evolved node Bs (ENBs) (also referred to as node Bs or base stations) 1a-05, 1a-10, 1a-15, and 1a-20, a mobility management entity (MME) 1a-25, and a serving-gateway (S-GW) 1a-30. A user equipment (UE) or terminal 1a-35 accesses an external network through the ENBs 1a-05 to 1a-20 and the S-GW 1a-30.

The ENBs 1a-05 to 1a-20 correspond to existing node Bs of a universal mobile telecommunications system (UMTS). An ENB is connected to the UE 1a-35 on a radio channel, and plays a more complicated role than that of the existing node B before LTE. In an LTE system, since all user traffic including a real-time service, such as voice over internet protocol (VoIP), through an internet protocol (IP) are serviced on shared channels, devices that performs scheduling through consolidation of state information, such as a buffer state, an available transmission power state, and a channel state of each UE, are necessary, and the ENBs 1a-05 to 1a-20 correspond to such scheduling devices. In general, one ENB controls a plurality of cells. For example, in order to implement a transmission speed of 100 Mbps, an LTE system uses, for example, orthogonal frequency division multiplexing (OFDM) in a bandwidth of 20 MHz as a radio access technology. Further, an LTE system adopts an adaptive modulation and coding (AMC) scheme that determines a modulation scheme and a channel coding rate to match a channel state of a terminal. The S-GW 1a-30 is a device that provides a data bearer, and generates or removes the data bearer under control of the MME 1a-25, The MME 1a-25 is a device that takes charge of not only mobility management of a terminal but also various kinds of control functions, and is connected to a plurality of base stations.

Figure 2:
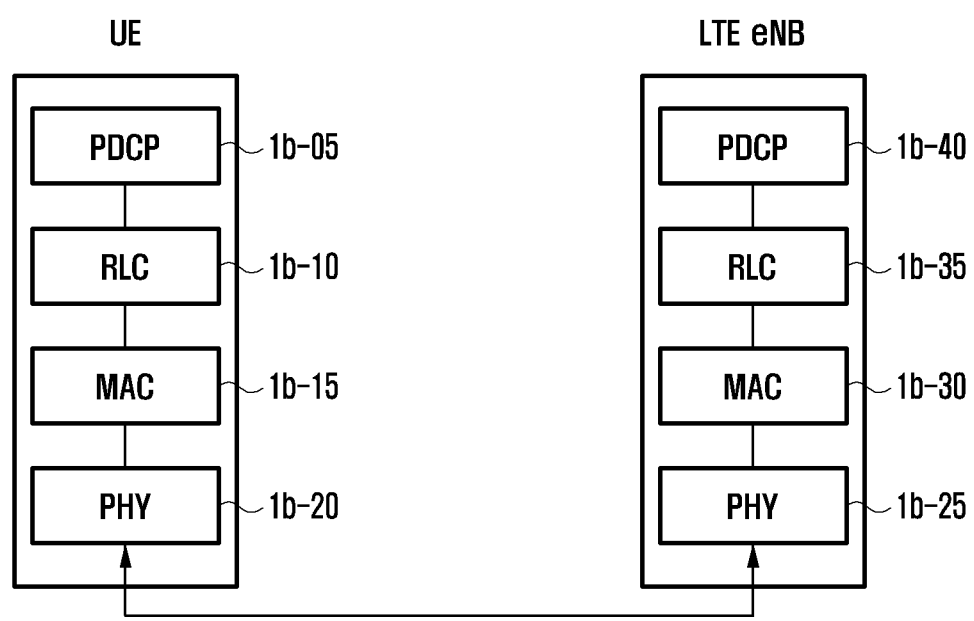
FIG. 2 is a block diagram of a radio protocol structure of an LTE system.

FIG. 2 is a block diagram of a radio protocol structure of an LTE system.

Referring to FIG. 2, in a UE or an ENB, a radio protocol of an LTE system is composed of a PDCP 1b-05 or 1b-40, an RLC 1b-10 or 1b-35, and a MAC 1b-15 or 1b-30, respectively. The PDCP 1b-05 or 1b-40 takes charge of IP header compression/decompression operations. The main functions of the PDCP are summarized as follows:
  Header compression and decompression: robust header compression (ROHC) only,
  Transfer of user data
  In-sequence delivery of upper layer PDUs at a PDCP reestablishment procedure for an RLC acknowledged mode (AM)
  For split bearers in dual connectivity (DC) (only support for an RLC AM): PDCP PDU routing for transmission and PDCP PDU reordering for reception
  Duplicate detection of lower layer SDUs at a PDCP reestablishment procedure for an RLC AM
  Retransmission of PDCP SDUs at handover and, for split bearers in DC, of PDCP PDUs at a PDCP data-recovery procedure, for an RLC AM
  Ciphering and deciphering
  Timer-based SDU discard in an uplink The RLC 1b-10 or 1b-35 reconfigures a PDCP PDU with a proper size and performs an automatic repeat request (ARQ) operation and the like. The main functions of the RLC are summarized as follows:
  Transfer of upper layer PDUs
  Error correction through an ARQ (only for AM data transfer)
  Concatenation, segmentation, and reassembly of RLC SDUs (only for unacknowledged mode (UM) and AM data transfer)
  Re-segmentation of RLC data PDUs (only for UM and AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM transfer)
  RLC reestablishment The MAC 1b-15 or 1b-30 is connected to several RLC layer devices configured in one device (e.g., terminal or base station), and performs multiplexing/demultiplexing of RLC PDUs into/from MAC PDU. The main functions of the MAC are summarized as follows:
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Hybrid automatic repeat request (HARQ) function (error correction through RQ)
  Priority handling between logical channels of one UE
  Priority handling between UEs by means of dynamic scheduling
  Multimedia broadcast multicast service (MBMS) service identification
  Transport format selection
  padding The PRY 1b-20 or 1b-25 performs channel coding and modulation of upper layer data to configure and transmit OFDM symbols to a radio channel, or performs demodulation and channel decoding of the OFDM symbols received on the radio channel to transfer the demodulated and channel-decoded data to an upper layer.

Figure 3:
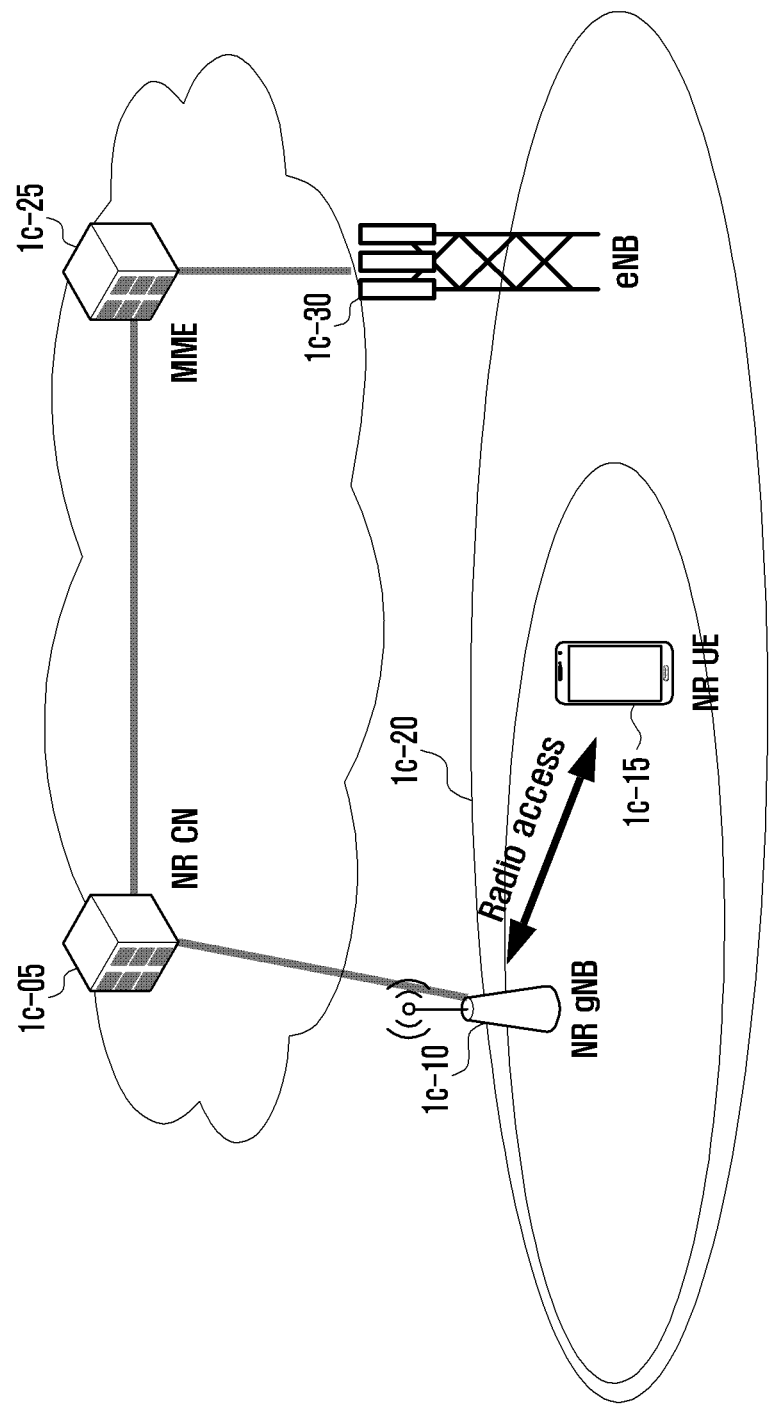
FIG. 3 is a diagram of a next-generation mobile communication system.

FIG. 3 is a diagram of a next-generation mobile communication system.

Referring to FIG, 3, a RAN of a next-generation mobile communication system (e.g., NR or 5G) is composed of a new radio node B (NR gNB or NR ENB) 1c-10 and a new radio core network (NR CN) 1c-05. A new radio user equipment (NR UE or terminal) 1c-15 accesses an external network through the NR gNB 1c-10 and the NR CN The NR gNB 1c-10 corresponds to an ENB of an existing LTE system. The NR gNB is connected to the NR UE 1c-15 on a radio channel, and thus it can provide a more superior service than the services of the ENB of an LTE system and an existing node B before the LTE system. Since all user traffic is serviced on shared channels in a next-generation mobile communication system, a device that performs scheduling through consolidation of status information, such as a buffer state, an available transmission power state, and a channel state of each UE, is necessary, and the NR gNB 1c-10 takes charge of this. One NR gNB generally controls a plurality of cells. In order to implement ultrahigh-speed data transmission as compared with the existing LTE, the NR gNB may have a maximum bandwidth that is higher than an existing bandwidth, and a beamforming technology may be additionally grafted in consideration of OFDM as a radio connection technology. Further, an AMC scheme determining a modulation scheme and a channel coding rate to match the channel state of the UE is adopted. The NR CN 1c-05 performs functions of mobility support, bearer configuration, and quality of service (QoS) configuration. The NR CN 1c-05 may include one or a plurality of devices taking charge of not only terminal mobility management but also various kinds of control functions, and is connected to a plurality of ENBs. Further, a next-generation mobile communication system may operate with an existing LTE system, and the device included in the NR CN 1c-05 is connected to an MME 1c-25 through a network interface. The MME 1c-25 is connected to an ENB 1c-30 that is an ENB of the existing LTE.

Figure 4:
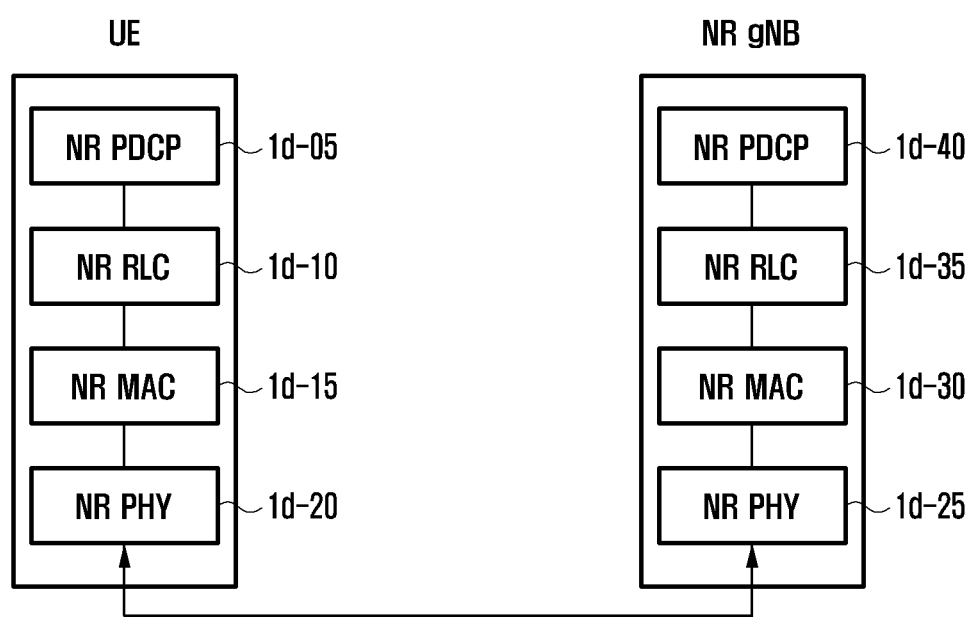
FIG. 4 is a block diagram of a radio protocol structure of a next-generation mobile communication system.

FIG. 4 is a block diagram of a next-generation mobile communication system.

Referring to FIG. 4, in a UE or an NR gNB, a radio protocol of a next-generation mobile communication system includes an NR PDCP 1d-05 or 1d-40, an NR RLC 1d-10 or 1d-35, and an NR MAC 1d-15 or 1d-30, respectively. The main function of the NR PDCP 1d-05 or 1d-40 may include parts of the following functions:

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in an uplink As described above, reordering of the NR PDCP devices may indicate reordering of PDCP PDUs received from a lower layer based on PDCP sequence numbers (SNs). The reordering may include delivery of data to an upper layer in the order of reordering, recording of lost PDCP PDUs through reordering, status report for the lost PDCP PDUs to a transmission side, and retransmission request for the lost PDCP PDUs. The main functions of the NR RLC 1d-10 or 1d-35 may include parts of the following functions:

Transfer of upper layer PDUs
in-sequence delivery of upper layer PDUs
Out-of-sequence delivery of upper layer PDUs
Error correction through an ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, in-sequence delivery of NR RLC devices may indicate in-sequence delivery of RLC SDUs received from a lower layer to an upper layer, in the case where one original RLC SDU is segmented into several RLC SDUs to be received, the delivery may include reassembly and delivery of the RLC SDUs, reordering of the received RLC PDUs based on an RLC sequence number (SN) or a PDCP SN, recording of lost RLC PDUs through reordering, a status report for the lost RLC PDUs to a transmission side, and a retransmission request for the lost PDCP PDUs, in-sequence delivery of only RLC SDUs just before the lost RLC SDU to an upper layer if there is a lost RLC SDU, in-sequence delivery of all RLC SDUs received before a certain timer starts to an upper layer if the timer has expired even though there is a lost RLC SDU, or in-sequence delivery of all RLC SDUs received to an upper layer if the timer has expired even though there is a lost RLC SDU. Further, the RLC PDUs may be processed in order of reception (regardless of sequence number) and may be transferred to a PDCP device in an out-of-sequence manner. In the case of segments, the segments stored in a buffer or received later are received and reconfigured into one complete RLC PDU to be processed and transferred to a PDCP device. An NR RLC layer may not include a concatenation function, and the function may be performed by an NR MAC layer or may be replaced by a multiplexing function of the NR MAC layer.

As described above, an out-of-sequence delivery of an NR RLC device indicates a function of transferring ROC SDUs received from a lower layer directly to an upper layer in an out-of-sequence manner. If one original RLC SDU is segmented into several RLC SDUs to be received, delivery may include reassembly and delivery of the RLC SDUs, and recording of lost RLC PDUs through storing and ordering of the RLC SNs or PDCP SNs of the received. RLC PDUs.

The NR MAC 1d-15 or 1d-30 may be connected to several NR RLC layer devices configured in one terminal, and the main functions of the NR MAC may include parts of the following functions:

Mapping between logical channels and transport channels
Multiplexing/demultiplexing of MAC SDUs
Scheduling information reporting
HARQ function (error correction through HARQ
Priority handling between logical channels of one UE
Priority handling between UEs by means of dynamic scheduling
MBMS service identification
Transport format selection
padding The NR PHY layer 1d-20 or 1d-25 may perform channel coding and modulation of upper layer data to configure and transmit OFDM symbols to a radio channel, or may perform demodulation and channel decoding of the OFDM symbols received on the radio channel to transfer the demodulated and channel-decoded data to an upper layer.

A device that performs the operation of each layer, such as the NR PDCP layer, NR RLC layer, or NR MAC layer, may be a processor, a processing unit, or a processing module that performs the operation of each layer. Further, the device may be a processor, a processing unit, or a processing module that performs the operation of at least two layers. The processor, the processing unit, or the processing module may be included in a controller of the device (e.g., a terminal or a base station).

Figure 5:
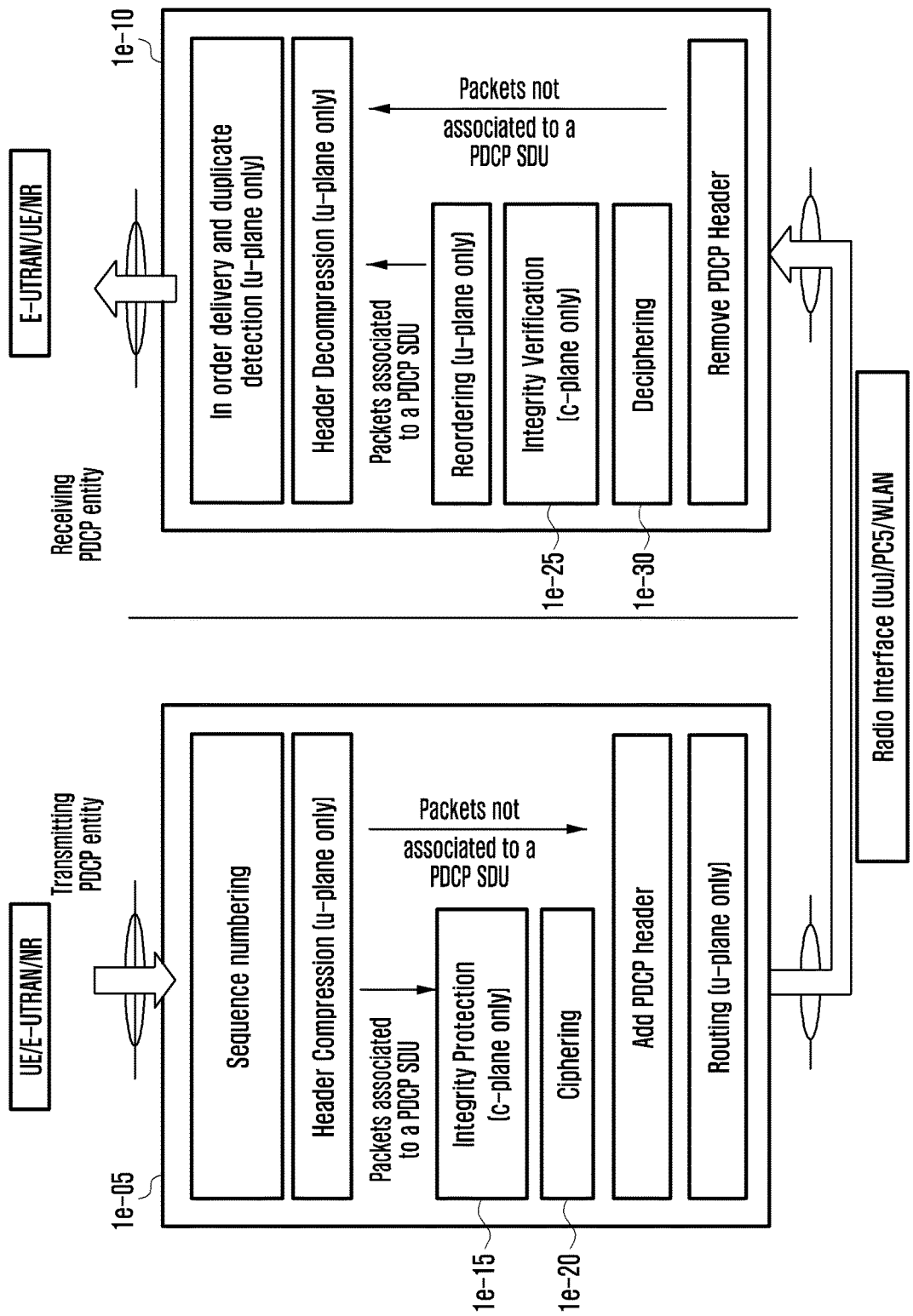
FIG. 5 is a block diagram of a PDCP layer that takes charge of a deciphering function according to an embodiment of the present disclosure.

FIG. 5 is a block diagram of a PDCP layer that takes charge of a deciphering function according to an embodiment of the present disclosure.

Referring to FIG. 5, a transmission side 1e-05 of a PDCP layer performs header compression, integrity protection 1e-15, and ciphering 1e-20. In contrast, a reception side 1e-10 of the PDCP layer performs header decompression, integrity verification 25, and deciphering 1e-30. The header compression and decompression, the integrity protection and verification, and the ciphering and deciphering may be performed by a device that performs a PDCP layer operation. Integrity protection may be used to determine whether a corresponding PDCP PDU has been modified or corrupted by anyone or for a certain reason during a delivery process at the transmission end, and this may be identified through the integrity verification at the reception end. In contrast, ciphering is performed to prevent a hacker who maliciously intends to read information by reading the corresponding PDCP PDU, and at a normal reception end, the contents of the PDCP PDU may be read through a deciphering process.

Ciphering and deciphering processes of a terminal are functions that consume a lot of data processing time and a lot of processing power of the terminal, and, in order to provide services with a high data rate and a low latency response time, it is necessary to continuously perform ciphering and deciphering processes without delay. Accordingly, an embodiment of the present disclosure provides an out-of-sequence deciphering method in which a reception end of a terminal may continuously and rapidly perform a deciphering process without delay. The out-of-sequence deciphering method may be used at the reception end of the terminal. However, in the case of a service that does not require a high data rate and a low latency response time, the terminal may selectively interrupt the out-of-sequence deciphering method. An out-of-sequence deciphering method is a rapid deciphering method for providing a high data rate and a low latency response time that uses a lot of processing power of the terminal and consumes a lot of battery power. Accordingly, an out-of-sequence deciphering method may be applied or not for each service or each bearer. Further, whether to apply an out-of-sequence deciphering method may be determined in accordance with a QoS parameter, and if it is necessary to save battery power of the terminal for a certain reason, the terminal may interrupt the out-of-sequence deciphering method.

Figure 6:
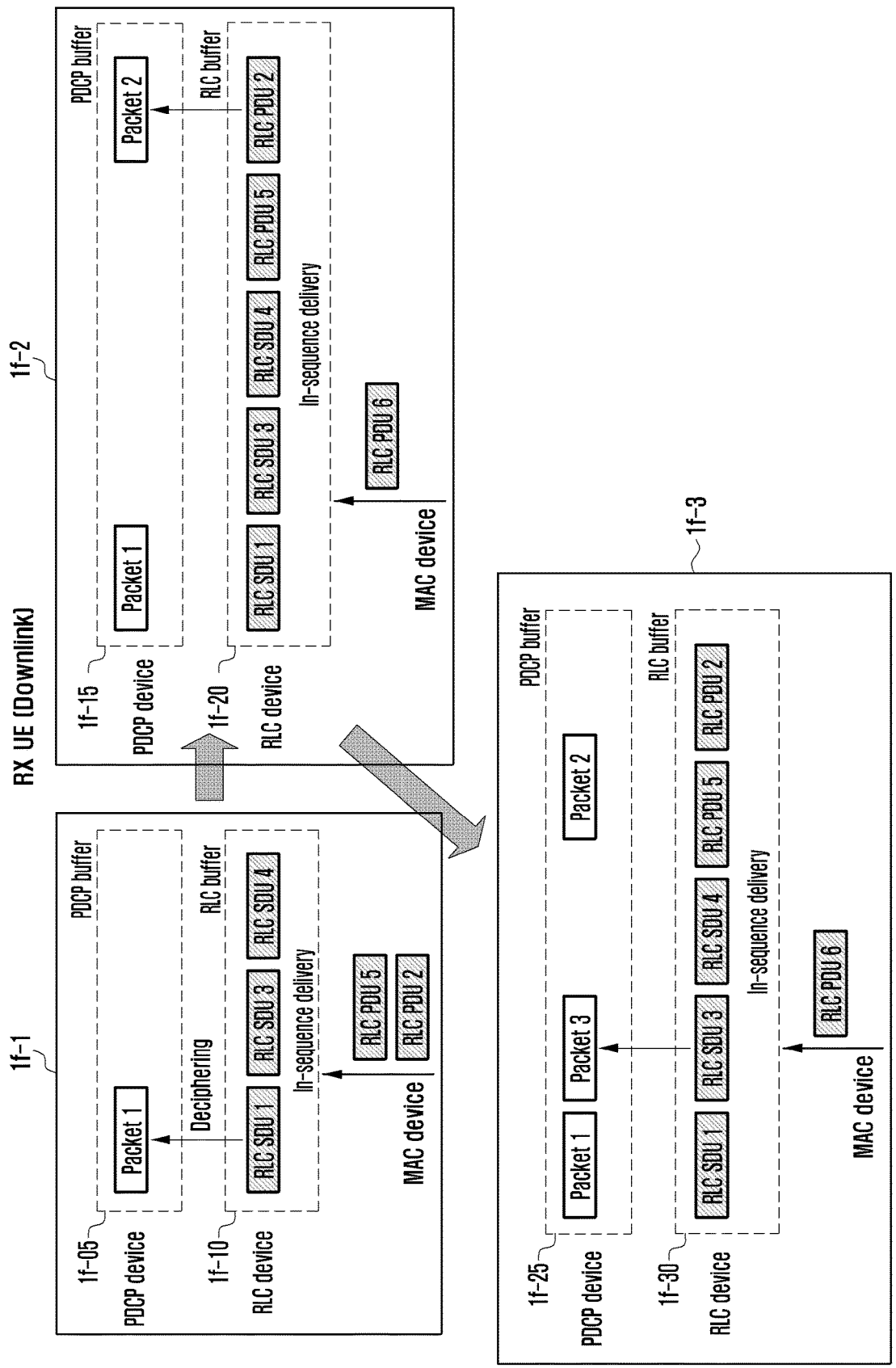
FIG. 6 is a block diagram of a process in which a terminal deciphers data in an LTE system.

FIG. 6 is a block diagram of a process in which a terminal deciphers data in an LTE system.

Referring to FIG. 6, in an LTE system, a downlink in which a terminal receives data is provided. First, operation 1*f*-1 is described. In a downlink scenario, a terminal may receive data, and a device that performs an RLC layer operation may receive RLC PDUs from a device that performs a MAC layer operation, analyze RLC headers, determine sequence numbers of the RLC PDUs, and store the RLC PDUs in an RLC buffer 1*f*-10 with the headers removed. The RLC buffer 1*f*-10 may be a storage device in which the device that performs the RLC layer operation stores the RLC SDUs.

In the LTE system, the device that performs the RLC layer operation supports in-sequence delivery of RLC PDUs to the device that performs the PDCP layer operation. Accordingly, if even one out-of-sequence RLC PDU exists, the device that performs the RLC layer operation does not transfer any RLC PDU that may be received after the sequence number of the out-of-sequence RLC PDU to the device that performs the PDCP layer operation. Accordingly, since the received RLC PDU is not transferred to the device that performs the PDCP layer operation, the deciphering process may be delayed. For example, if the RLC PDUs corresponding to the sequence numbers 1, 3, and 4 have arrived, but the RLC PDU corresponding to the sequence number 2 has not arrived at the device that performs the RLC layer operation, the device that performs the RLC layer operation only transfers the SDU corresponding to the sequence number 1 to the device that performs the PDCP layer operation.

The device that performs the PDCP layer operation may analyze the PDCP header of the PDCP PDU (=RLC SDU), decipher a data packet through removal of the PDCP header, and then store the deciphered data packet in a PDCP buffer 1*f*-05. The PDCP buffer 1*f*-05 may be a storage device in which the device that performs the PDCP layer operation stores the deciphered data packet. Thereafter, until the RLC PDU corresponding to the sequence number 2 arrives, the device that performs the RLC layer operation does not transfer the RLC PDUs that have already arrived to the device that performs the PDCP layer operation. Accordingly, the RLC PDUs received by the device that has already performed the RLC layer operation are not transferred to the device that performs the PDCP layer operation in order to first perform the deciphering.

At operation 1*f*-2, if the RLC PDU corresponding to the sequence number 2 arrives at the device that performs the RLC layer operation, and thus the sequence numbers 1, 2, 3, 4, and 5 are in sequence, the device that performs the RLC layer operation first transfers the RLC PDU corresponding to the sequence number 2 from the RLC buffer 1*f*-20 to the device that performs the PDCP layer operation in order to support in-sequence delivery to the device that performs the PDCP layer operation. The device that performs the RLC layer operation may transfer the RLC SDU, which is obtained by removing the header from the RLC PDU corresponding to the sequence number 2, from the RLC buffer 1*f*-20 to the device that performs the PDCP layer operation. The device that performs the PDCP layer operation analyzes and removes the PDCP header, and deciphers the data packet to store the deciphered data packet in the PDCP buffer 1*f*-15.

At operation 1*f*-3, in the same manner described above, the device that performs the RLC layer operation may transfer the RLC PDU corresponding to the sequence number 3 to the device that performs the PDCP layer operation. The device that performs the RLC layer operation may transfer the RLC SDU, which is obtained by removing the header from the RLC PDU corresponding to the sequence number 3, from the RLC buffer 1*f*-30 to the device that performs the PDCP layer operation. The device that performs the PDCP layer operation deciphers the received RLC SDU, and stores the data packet in a PDCP buffer 1*f*-25.

In the LTE system, the terminal supports the above-described in-sequence delivery procedure from the device that performs the RLC layer operation to the device that performs the PDCP layer operation, and performs deciphering based thereon. Accordingly, the deciphering process is delayed due to the lost RLC PDUs or RLC PDUs of which transmission is delayed.

Figure 7:
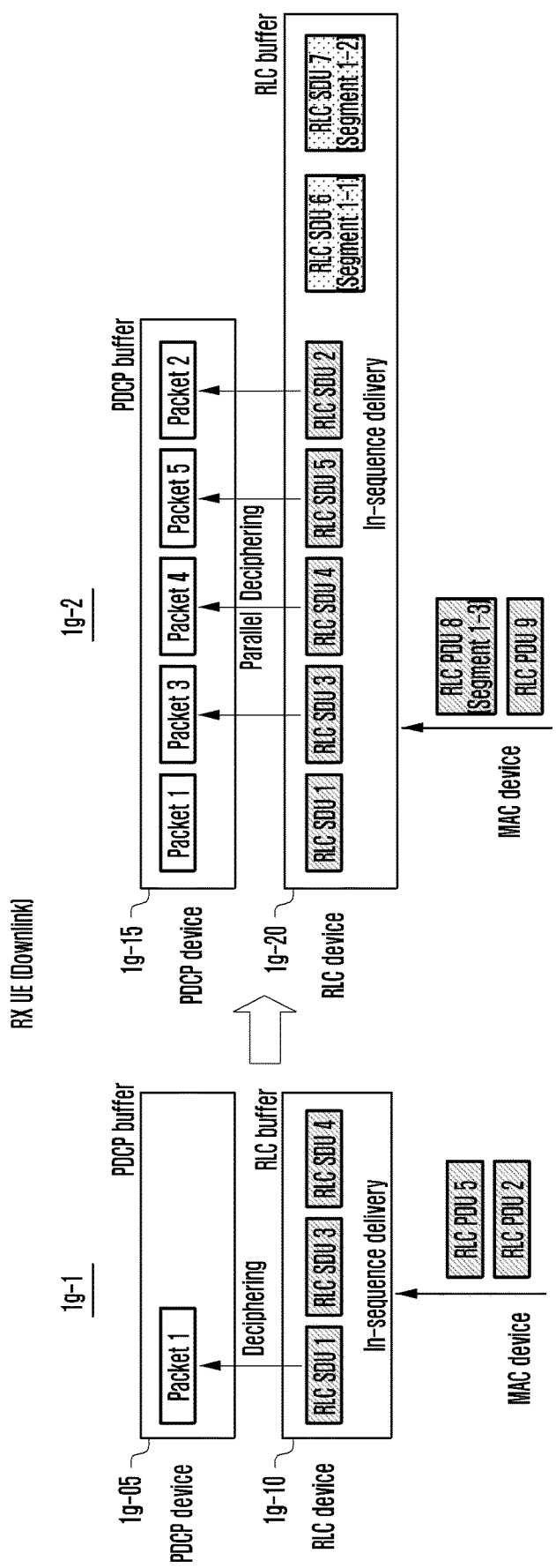
FIG. 7 is a block diagram of a deciphering method in which a receiving end of a terminal can rapidly perform a deciphering process according to an embodiment of the present disclosure.

FIG. 7 is a block diagram of a deciphering method in which a receiving end of a terminal may rapidly perform a deciphering process according to an embodiment of the present disclosure.

Referring to FIG. 7, a downlink in which a terminal receives data is provided. First, operation 1*g*-1 is described. In a downlink scenario, a terminal may receive data, and a device that performs an RLC layer operation may receive RLC PDUs from a device that performs a MAC layer operation, analyze RLC headers, determine sequence numbers of the RLC PDUs, and store the RLC PDUs in an RLC buffer 1*g*-10 with the headers removed.

If even one out-of-sequence RLC PDU exists in a state where the device that performs the RLC layer operation supports in-sequence delivery of RLC PDUs to the device that performs the PDCP layer operation, the device that performs the RLC layer operation does not transfer any RLC PDU that may he received after the sequence number of the out-of-sequence RLC PDU to the PDCP device. For example, if the RLC PDUs corresponding to the sequence numbers 1, 3, and 4 have arrived, but the RLC PDU corresponding to the sequence number 2 has not arrived at the device that performs the RLC layer operation, the device that performs the RLC layer operation only transfers the RLC SDU corresponding to the sequence number 1 to the device that performs the PDCP layer operation.

The device that performs the PDCP layer operation may analyze the PDCP header of the RLC SDU (=PDCP SDU), decipher a data packet through removal of the PDCP header, and store the deciphered data packet in a PDCP buffer 1g-05. Until the RLC PDU corresponding to the sequence number 2 arrives, the device that performs the RLC layer operation does not transfer the RLC PDUs that have already arrived to the device that performs the PDCP layer operation.

At operation 1g-2, if the RLC PDU corresponding to the sequence number 2 arrives at the device that performs the RLC layer operation, and thus the sequence numbers 1, 2, 3, 4, and 5 are in sequence, the device that performs the RLC layer operation may transfer the RLC PDUs corresponding to the sequence numbers 2, 3, 4, and 5 to the device that performs the PDCP layer operation in parallel. That is, at least two of the RLC SDUs corresponding to the sequence numbers 2, 3, 4, and 5 may be transferred. The device that performs the PDCP layer operation may perform parallel deciphering of the respective RLC SDUs received in parallel. If the terminal does not have the capability to perform parallel deciphering of several RLC SDUs, the deciphering may be performed for a certain number of RLC SDUs that can be deciphered in parallel. The number may be 1 or more.

In the same manner, when ciphering PDCP PDUs, even the transmission end may perform parallel ciphering of several PDCP PDUs.

As described above, the device that performs the RLC layer operation receives the RLC PDU from the device that performs the MAC layer operation and analyzes the RLC header, and in this case, the RLC PDU may not include a complete RLC SDU, but may include only a segment of the RLC SDU. If the RLC PDU includes only a segment of the RLC SDU, the corresponding RLC SDU is not transferred to the device that performs the PDCP layer operation, but it is identified whether related segments exist in the RLC buffer 1g-20. If the related segments exist, reassembly thereof is performed, and if the complete RLC SDU is not configured, the segments are stored in the buffer 1g-20. Thereafter, if the remaining segments of the RLC SDU are received, the device that performs the RLC layer operation may configure one complete RLC SDU through reassembly of the segments, and may transfer the complete RLC SDU to the device that performs the PDCP layer operation. Accordingly, if it is determined that the RLC SDU is the segment through analysis of the RLC header of the RLC PDU, the deciphering process is unable to be performed rapidly. In this case, reassembly of the segments is performed to configure a complete RLC SDU after all the segments are received, and the device that performs the PDCP layer operation may perform the deciphering procedure after receiving the complete RLC SDU. Accordingly, as illustrated in FIG. 7, since the in-sequence RLC PDUs corresponding to sequence numbers 6 and 7 are RLC PDUs corresponding to the segments, and it is not possible to configure one complete RLC PDU through reassembly of the segments, the segments are stored in the RLC buffer without being transferred to the PDCP device, and reception of the remaining segments must wait. Identification of whether the RLC PDU corresponds to the segment through the RLC header may be determined, for example, in consideration of RLC header fields related to segmentation information.

In an embodiment of the present disclosure, the deciphering method may be used at the reception end of the terminal. However, if the service does not require a high data rate and a low latency response time, the terminal may selectively interrupt the proposed deciphering method. The deciphering method is a rapid deciphering method for providing high data rate and low latency response time, which may use a lot of processing power of the terminal and consume a lot of battery power. Accordingly, the deciphering method may be applied or not for each service or each bearer. That is, in the case where a service requires high data rate and low transmission delay, such as an ultra-reliable low latency communication (URLLC) service, high-quality audio streaming, or high-definition video streaming (e.g., UHD streaming), the deciphering method may be applied, whereas in the case where a service does not require high data rate and low transmission delay, the deciphering method may not be applied. Further, whether to apply the deciphering method may be determined in accordance with a QoS parameter, and if it is necessary to save battery power of a terminal for a certain reason, the terminal may interrupt the deciphering method. Further, the terminal may determine whether to apply the deciphering method in real time based on a certain condition. The condition may be a data rate, a transmission delay, a QoS parameter, a priority, or a service type, and the condition may be predetermined. If the condition is satisfied, the proposed deciphering method may be performed, whereas if the condition is not satisfied, the proposed deciphering method may not be performed.

The deciphering method described above may be applied to a terminal of a current LTE system and a next-generation communication system. That is, if it is intended for a terminal to receive a service having a high throughput and a low transmission delay through an LTE system, an embodiment of the present disclosure may be applied to the terminal. Further, if it is necessary to save battery power, if the above-described service is unnecessary, or for a certain reason, the terminal may interrupt the application of an embodiment of the present disclosure.

Figure 8:
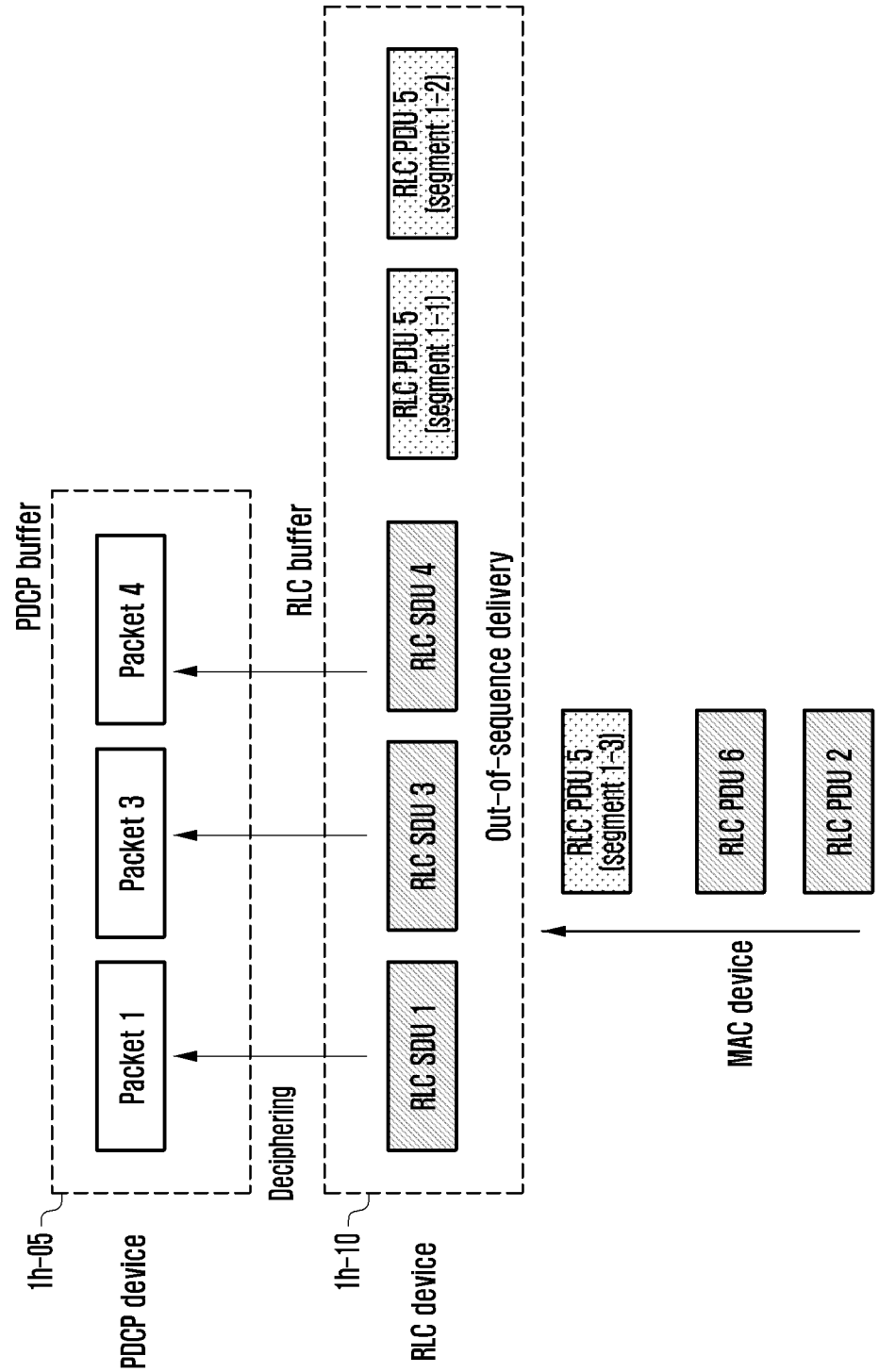
FIG. 8 is a block diagram of an out-of-sequence deciphering method in which a receiving end of a terminal can perform a deciphering process continuously and rapidly without delay according to an embodiment of the present disclosure.

FIG. 8 is a block diagram of an out-of-sequence deciphering method in which a receiving end of a terminal may perform a deciphering process continuously and rapidly without delay according to an embodiment of the present disclosure. A device that performs an RLC layer operation may provide RLC PDUs to a device that performs a PDCP layer operation regardless of the order of sequence numbers of RLC PDUs. The detailed operation is described below.

Referring to FIG. 8, a downlink in which a terminal receives data is provided. In a downlink scenario, a terminal may receive data, and the device that performs the RLC layer operation may receive the RLC PDUs from the device that performs a MAC layer operation, analyze RLC headers, determine sequence numbers of the RLC PDUs, and store the RLC PDUs in an RLC buffer 1h-10 with the headers removed. In an embodiment of the present disclosure, even if the device that performs the RLC layer operation supports (or does not support) in-sequence delivery of RLC PDUs to the device that performs the PDCP layer operation, the device that performs the RLC layer operation may first transfer the out-of-sequence RLC PDUs to the device that performs the PDCP layer operation. That is, the device that performs the RLC layer operation may transfer RLC SDUs obtained by removing the RLC headers from the RLC PDUs to the device that performs the PDCP layer operation. Further, the device that performs the PDCP layer operation may directly perform the deciphering by analyzing and removing the PDCP headers of the RLC PDUs. That is, even if out-of-sequence RLC SDUs are received, the device that performs the PDCP layer operation may perform deciphering by analyzing and removing the PDCP headers. As described above, the device that performs the PDCP layer operation may store the PDCP sequence numbers through analysis of the PDCP headers. The PDCP sequence numbers may correspond to the sequence numbers of the RLC PDUs or RLC SDUs. The device that performs the PDCP layer operation may perform in-sequence delivery of data packets using the PDCP sequence numbers when transferring the data packets to an upper layer.

Accordingly, in an embodiment of the present disclosure, even if the device that performs the RLC layer operation does not transfer the RLC PDUs or RLC SDUs in sequence, the device that performs the PDCP layer operation may transfer them to the upper layer in sequence, and may continuously perform deciphering regardless of the order of sequence numbers of the received RLC SDUs. If a speed at which the RLC SDUs come from the device that performs the RLC layer operation to the device that performs the PDCP layer operation is greater than a speed at which one RLC SDU is deciphered, the device that performs the PDCP layer operation may perform the deciphering by analyzing and removing in parallel the PDCP headers of the RLC SDUs, and store data packets in a PDCP buffer 1h-05, if the terminal does not have the capability to perform parallel deciphering of several RLC SDUs, deciphering may be performed for a certain number of RLC SDUs that can be deciphered in parallel. The number may be 1 or more. In the same manner as described above, when ciphering PDCP PDUs, even the transmission end (terminal or base station) may perform parallel ciphering of several PDCP PDUs.

As described above, the device that performs the RLC layer operation may analyze the RLC headers of the RLC PDUs received from the MAC device that performs the layer operation, and transfer the RLC SDUs to the device that performs the PDCP layer operation regardless of the order of the sequence numbers (i.e., even if there are lost RLC PDUs). The device that performs the PDCP layer operation may directly perform deciphering of the received RLC SDUs in advance regardless of the order of the sequence numbers. For example, if the RLC PDUs corresponding to the sequence numbers 1, 3, and 4 arrive at the device that performs the RLC layer operation, the device that performs the RLC layer operation may store the RLC SDUs in the RLC buffer 1h-10 by analyzing and removing the RLC headers of the RLC PDUs corresponding to the sequence numbers 1, 3, and 4, and may directly transfer the RLC SDUs to the device that performs the PDCP layer operation again regardless of the order thereof. The device that performs the RLC layer operation may directly transfer the RLC SDUs to the device that performs the PDCP layer operation without storing the RLC SDUs in the RLC buffer 1h-10. The device that performs the PDCP layer operation may directly decipher the received RLC SDUs, and store the deciphered data packet in the PDCP buffer 1h-05. When the device that performs the RLC layer operation receives the RLC PDUs from the device that performs the MAC layer operation, and analyzes the RLC headers, the RLC PDU may not include a complete RLC SDU.

If the RLC PDU includes only a segment of the complete RLC SDU, the RLC SDU corresponding to the segment is not transferred to the device that performs the PDCP layer operation. The device that performs the RLC layer operation identifies whether related segments exist in the RLC buffer 1h-10. If the related segments exist, the device performs reassembly thereof, and if the complete RLC SDU is not configured, the device stores the segments in the RLC buffer 1h-10. If the complete RLC SDU is configured as the result of the reassembly, the device may transfer the corresponding SDU to the device that performs the PDCP layer operation regardless of the sequence number of the SDU.

Thereafter, the device that performs the RLC layer operation may configure one complete RLC SDU through reassembly of the received remaining segments of the complete RLC SDU, and if the complete RLC SDU is configured, the device may transfer the complete RLC SDU to the device that performs the PDCP layer operation. Accordingly, if it is determined that the RLC SDU is the segment through analysis of the RLC header, the RLC SDU is unable to be provided from the device that performs the RLC layer operation to the device that performs the PDCP layer operation. Accordingly, the deciphering process is unable to be performed rapidly. In this case, the reassembly of the segments is performed to configure the complete RLC SDU after all the segments are received, and the complete RLC SDU can be transferred to the device that performs the PDCP layer operation. The device that performs the PDCP layer operation can perform deciphering after receiving the complete RLC SDU.

As described above, the identification of whether the RLC SDU is the segment through the RLC header may be determined, for example, in view of RLC header fields related to segmentation information. As described above, the several RLC PDUs including the segments divided from the one RLC SDU may have different RLC sequence numbers or may have the same RLC sequence number. This may depend on how the transmission end allocates the RLC sequence numbers for the segments, and in either case, it can be determined whether the RLC SDU is one complete RLC SDU or the segment in view of the segmentation related field of the RLC header.

In an embodiment of the present disclosure, the deciphering method may be used at the reception end of the terminal. However, if a service does not require a high data rate and a low latency response time, the terminal may selectively interrupt the proposed deciphering method. The deciphering method is a rapid deciphering method for providing high data rate and low latency response time, which may use a lot of processing power of the terminal and consume a lot of battery power. Accordingly, the deciphering method may be applied or not for each service or bearer. That is, in the case where a service requires high data rate and low transmission delay, such as a URLLC service, high-quality audio streaming, or high-definition video streaming (e.g., UHD streaming), the deciphering method may be applied, whereas in the case where a service does not require high data rate and low transmission delay, the deciphering method may not be applied. Further, whether to apply the deciphering method may be determined in accordance with a QoS parameter, and if it becomes necessary to save battery power of the terminal for a certain reason, the terminal may interrupt the deciphering method. Further, the terminal may determine whether to apply the deciphering method in real time on a certain condition. The condition may be a data rate, a transmission delay, parameter, a priority, or a service type, and may be predetermined. If the condition is satisfied, the proposed deciphering method may be performed, whereas if the condition is not satisfied, the proposed deciphering method may not be performed. The out-of-sequence deciphering method may be applied to both where the RLC device supports in-sequence delivery and does not support in-sequence delivery, and is also applicable to a terminal of an LTE system.

The deciphering method as described above may be applied to a terminal of a current LTE system. That is, if it is intended for a terminal to receive a service having high throughput and low transmission delay through an LTE system, an embodiment of the present disclosure may be applied to the terminal, and may also be applied to a next-generation communication system. Further, if it is necessary to save battery power, if the above-described service is unnecessary, or for a certain reason, the terminal may interrupt the application of an embodiment of the present disclosure.

Figure 9:
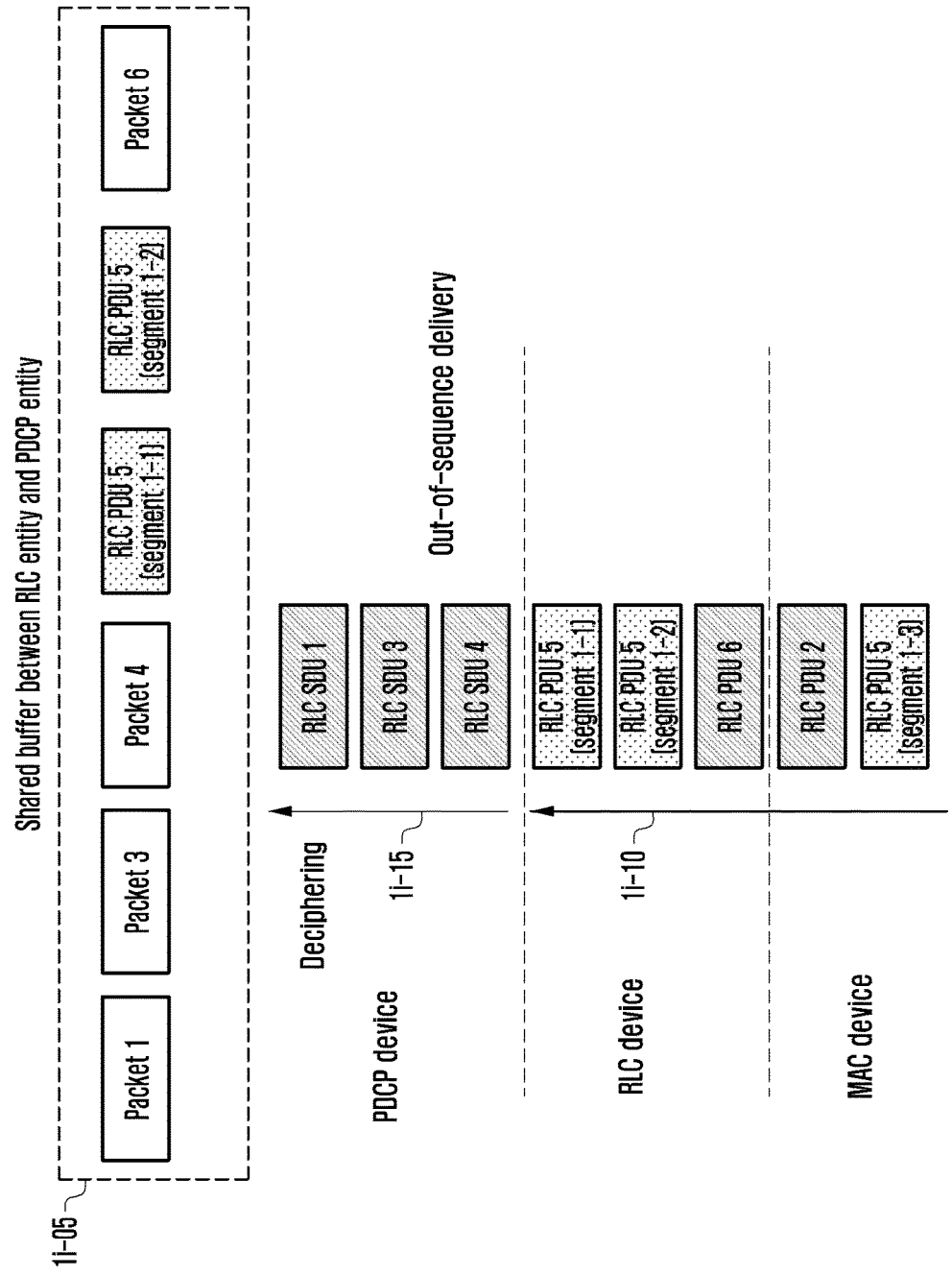
FIG. 9 is a block diagram of an out-of-sequence deciphering method in which a receiving end of a terminal can perform a deciphering process continuously and rapidly without delay according to an embodiment of the present disclosure.

FIG. 9 is a block diagram of an out-of-sequence deciphering method in which a receiving end of a terminal may perform deciphering continuously and rapidly without delay according to an embodiment of the present disclosure.

Referring to FIG. 9, a downlink in which a terminal receives data is provided. In a downlink scenario, a terminal may receive data, and the device that performs the RLC layer operation may receive RLC PDUs from the device that performs the MAC layer operation. In an embodiment of the present disclosure, it is proposed that the PDCP device and the RLC device may not use independent buffers as illustrated in FIGS. 7 and 8, but use one shared buffer. That is, the PDCP device and the RLC device may share one buffer (e.g., a flash memory).

If the RLC PDUs are received from the device that performs the MAC layer operation, the device that performs the RLC layer operation, at operation 1i-10, may analyze and remove the RLC headers from the received RLC PDUs, and provide RLC SDUs (=PDCP PDUs) to the device that performs the PDCP layer operation. The device that performs the PDCP layer operation, at operation 1i-15, may decipher the RLC SDUs and store the deciphered RLC SDUs in a shared buffer 1i-05.

For example, procedures before storing the RLC SDUs in the shared buffer 1i-05 may be performed on a dynamic random access memory (DRAM). Further, if a speed at which the device that performs the MAC layer operation transfers the RLC PDU to the device that performs the RLC layer operation, is greater than a speed at which one RLC PDU is received, the RLC header is analyzed and removed from the RLC PDU, and the RLC SDU (PDCP PDU) is deciphered and stored in the shared buffer, the above-described procedures may be performed in parallel with respect to the RLC SDUs. If the terminal does not have the capability to perform parallel deciphering of several RLC SDUs, deciphering may be performed for a certain number of RLC SDUs that can be deciphered in parallel. The number may be 1 or more. In the same manner, when ciphering PDCP PDUs, even the transmission end (terminal or base station) may perform parallel ciphering of several PDCP PDUs.

In an embodiment of the present disclosure, the out-of-sequence deciphering method according to the present disclosure, as compared with the second embodiment, since the device that performs the PDCP layer operation and the device that performs the RLC layer operation share the buffer, the number of memory accesses occurring when processing and storing data can be reduced, and the buffer can be managed more efficiently. Accordingly, it is possible to obtain a greater data processing speed. Further, the out-of-sequence deciphering method may be applied to a case where the RLC device supports in-sequence delivery, a case where the RLC device does not support in-sequence delivery, and to a terminal of an LTE system.

When the device that performs the RLC layer operation receives the RLC PDUs from the device that performs the MAC layer operation, and analyzes the RLC headers, the RLC PDU may not include a complete RLC SDU, but may include only a segment of the complete RLC SDU. In this case, the RLC SDU corresponding to the segment is not transferred to the device that performs the PDCP layer operation. If the device that performs the RLC layer operation identifies whether related segments exist in the RLC buffer, it performs reassembly thereof, and if the complete RLC SDU is not configured, it stores the segments in the RLC buffer. Thereafter, the device that performs the RLC layer operation may configure one complete RLC SDU through reassembly of the received remaining segments of the complete RLC SDU, and may transfer the complete RLC SDU to the device that performs the PDCP layer operation.

Accordingly, if it is determined that the RLC SDU is the segment through analysis of the RLC header, deciphering is unable to be performed rapidly. In this case, reassembly of the segments is performed to configure the complete RLC SDU after all the segments are received, and the complete RLC SDU may be transferred to the device that performs the PDCP layer operation. The device that performs the PDCP layer operation may perform deciphering after receiving the complete RLC SDU. As described above, identification of whether the RLC SDU is a segment through the RLC header may be determined, for example, in view of RLC header fields related to segmentation information. As described above, several RLC PDUs including segments divided from one RLC SDU may have different RLC sequence numbers or the same RLC sequence number. This may depend on how the transmission end allocates the RLC sequence numbers for the segments, and in either case, it can be determined whether the RLC SDU is one complete RLC SDU or a segment in view of the segmentation related field of the RLC header.

In an embodiment of the present disclosure, the deciphering method may be used at the reception end of the terminal. However, if the service does not require a high data rate and a low latency response time, the terminal may selectively interrupt the deciphering method. The deciphering method is a rapid deciphering method for providing high data rate and low latency response time, which may use a lot of processing power of the terminal and consume a lot of battery power. Accordingly, the deciphering method may or not be applied for each service or bearer. That is, in a case where a service requires high data rate and low transmission delay, such as a URLLC service, high-quality audio streaming, or high-definition video streaming (e.g., UHD streaming), the deciphering method may be applied, whereas in a case where a service does not require high data rate and low transmission delay, the deciphering method may not be applied.

Further, whether to apply the deciphering method may be determined in accordance with a QoS parameter, and if it becomes necessary to save battery power of the terminal for a certain reason, the terminal may interrupt the deciphering method. Further, the terminal may determine whether to apply the deciphering method in real time based on a certain condition. The condition may be a data rate, a transmission delay, a QoS parameter, a priority, or a service type, and may be predetermined. If the condition is satisfied, the deciphering method may be performed, whereas if the condition is not satisfied, the deciphering method may not be performed. In an embodiment of the present disclosure, the out-of-sequence deciphering method may be applied to a case where the RLC device supports in-sequence delivery, a case where the RLC device does not support in-sequence delivery, and to a terminal of an LTE system.

The deciphering method described above may be applied to a terminal of a current LTE system. That is, if a terminal is to receive a service having a high throughput and a low transmission delay through an LTE system, an embodiment of the present disclosure may be applied to the terminal. Further, if it is necessary to save battery power, if the above-described service is unnecessary, or for a certain reason, the terminal may interrupt the application of the embodiment of the present disclosure.

Figure 10:
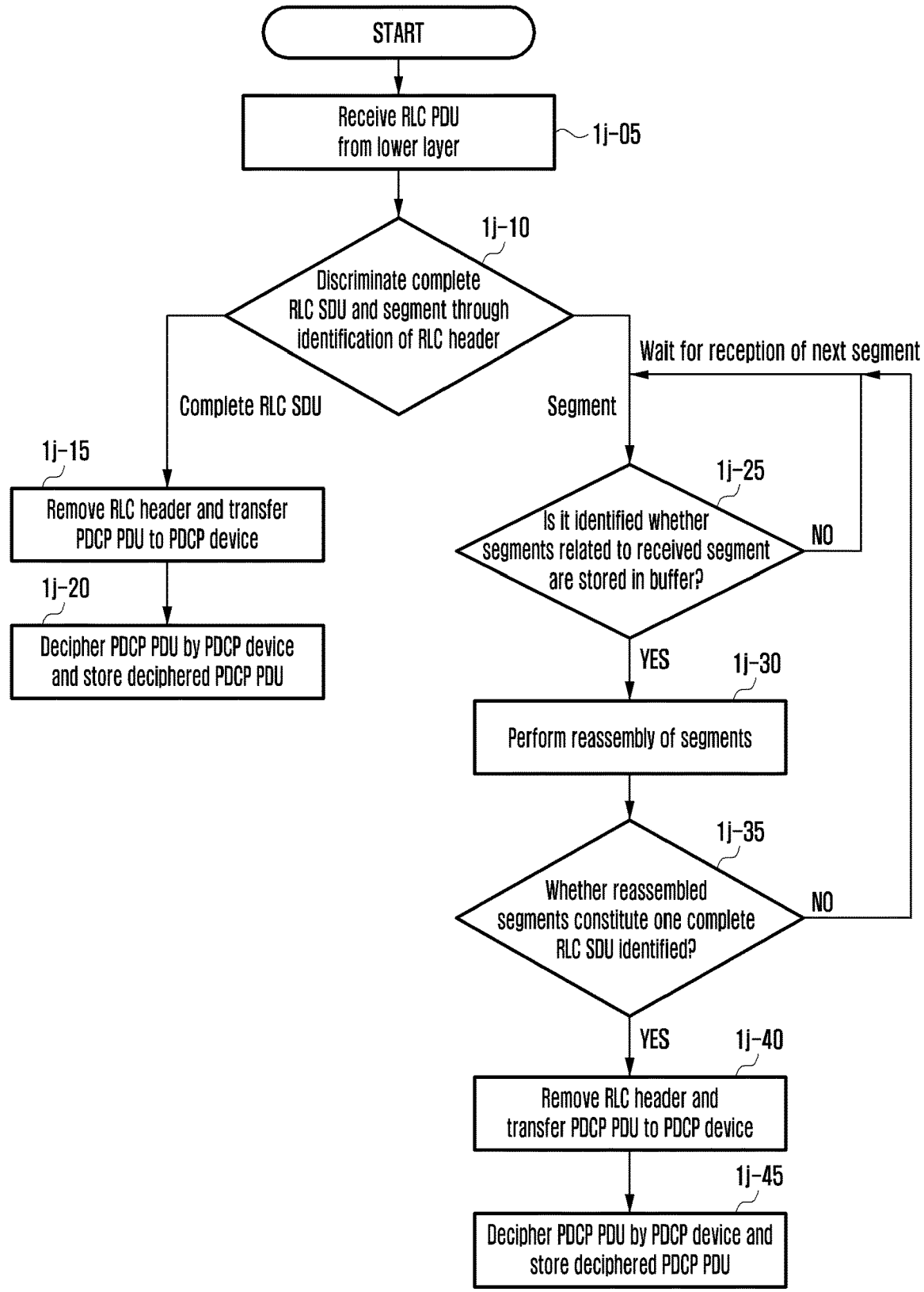
FIG. 10 is a flowchart of a method of a terminal with respect to an out-of-sequence deciphering method in which a terminal of a next-generation mobile communication system can accelerate data processing according to an embodiment of the present disclosure.

FIG. 10 is a flowchart of an operation of a terminal with respect to an out-of-sequence deciphering method in which a terminal of a next-generation mobile communication system may accelerate data processing according to an embodiment of the present disclosure.

Referring to FIG. 10, a downlink in which a terminal receives data in a next-generation mobile communication system is provided. In a downlink scenario, the terminal receives data, and at operation 1j-05, the device that performs an RLC layer operation receives RLC PDUs from the device that performs a MAC layer operation.

At operation 1j-40, the device that performs the RLC layer operation analyzes RLC headers, determines sequence numbers of the RLC PDUs, and identifies segmentation related RLC header fields to determine whether the RLC PDUs are complete RLC SDUs (or complete RLC PDUs) or segments. If the RLC PDUs are determined to be complete RLC PDUs at operation 1j-10, the method proceeds to operation 1j-15, whereas if the RLC PDUs are not complete RLC PDUs, the method proceeds to operation 1j-25.

If the RLC PDUs are complete RLC PDUs, the device that performs the RLC layer operation may directly remove RLC headers and may transfer RLC SDU (=PDCP PDU) to the device that performs the PDCP layer operation even if there are out-of-sequence RLC PDUs at operation 1j-15. At operation 1j-20, the device that performs the PDCP layer operation may analyze and remove the PDCP header from the received PDCP PDU, perform deciphering, and store data packets in a PDCP buffer. Further, if a speed at which the RLC SDUs come from the device that performs the RLC layer operation to the device that performs the PDCP layer operation is greater than a speed at which one RLC SDU is deciphered, the device may perform deciphering of the RLC SDUs in parallel, analyze and remove the PDCP headers from the RLC SDUs, and store data packets in the PDCP buffer. If the terminal does not have the capability to perform parallel deciphering of several RLC SDUs, deciphering may be performed for a certain number of RLC SDUs that can be deciphered in parallel. The number may be 1. For example, if the RLC PDUs corresponding to the sequence numbers 1, 3, and 4 arrive at the device that performs the RLC layer operation, the device that performs the RLC layer operation may store the RLC SDUs in the buffer by analyzing and removing the RLC headers of the RLC PDUs corresponding to the sequence numbers 1, 3, and 4, and may transfer the RLC SDUs to the device that performs the PDCP layer operation again. The device that performs the PDCP layer operation deciphers the received RLC SDUs and stores the data packet in the PDCP buffer.

At operation 1j-10, the device that performs the RLC layer operation receives the RLC PDU from the device that performs the MAC layer operation, and analyzes the RLC header. In this case, if the RLC PDU does not include a complete RLC SDU, but includes only a segment of the RLC SDU, the RLC SDU corresponding to the segment is not transferred to the device that performs the PDCP layer operation.

At operation 1j-25, the device that performs the RLC layer operation identifies whether related segments exist in the buffer. If the related segments do not exist, the device may wait for reception of the next segments. If the related segments exist in the buffer, the method proceeds to operation 1j-30 to perform reassembly thereof. If the complete RLC SDU does not result from performing reassembly, the device may store the segments in the RLC buffer. Thereafter, the remaining segments of the complete RLC SDU may be received, and one complete RLC SDU may result from reassembly of the received segments.

At operation 1j-35, the device that performs the RLC layer operation identies whether the reassembled segments form a complete SDU or a complete RLC PDU. If the reassembled segments form a complete RLC SDU, the method proceeds to operation 1j-40, otherwise the method proceeds to operation 1j-25.

At operation 1j-40, the device that performs the RLC layer operation removes the RLC header from the complete RLC PDU, and transfers the RLC SDU to the device that performs the PDCP layer operation. At operation 1j-45, the device that performs the PDCP layer operation analyzes and removes the PDCP header from the received PDCP PDU, performs deciphering, and stores a data. packet in the PDCP buffet.

Accordingly, if it is determined that the RLC SDU is a segment through analysis of the header, deciphering is unable to be performed rapidly. In this case, the reassembly of the segments is performed to configure the complete RLC SDU after all the segments are received, and then deciphering is performed with respect to the complete RLC SDU. As described above, the identification of whether the RLC SDU is a segment through the RLC header may be determined, for example, in view of RLC header fields related to segmentation information. That is, in an embodiment of the present disclosure, the RLC SDU may be provided to the device that performs the PDCP layer operation regardless of the sequence number of the RLC PDU or RLC SDU. However, if the RLC PDU or RLC SDU is a segment, the RLC PDU or RLC SDU is unable to be provided to the device that performs the PDCP layer operation until the segments are reassembled to form the complete RLC PDU or the complete RLC SDU.

Figure 11:
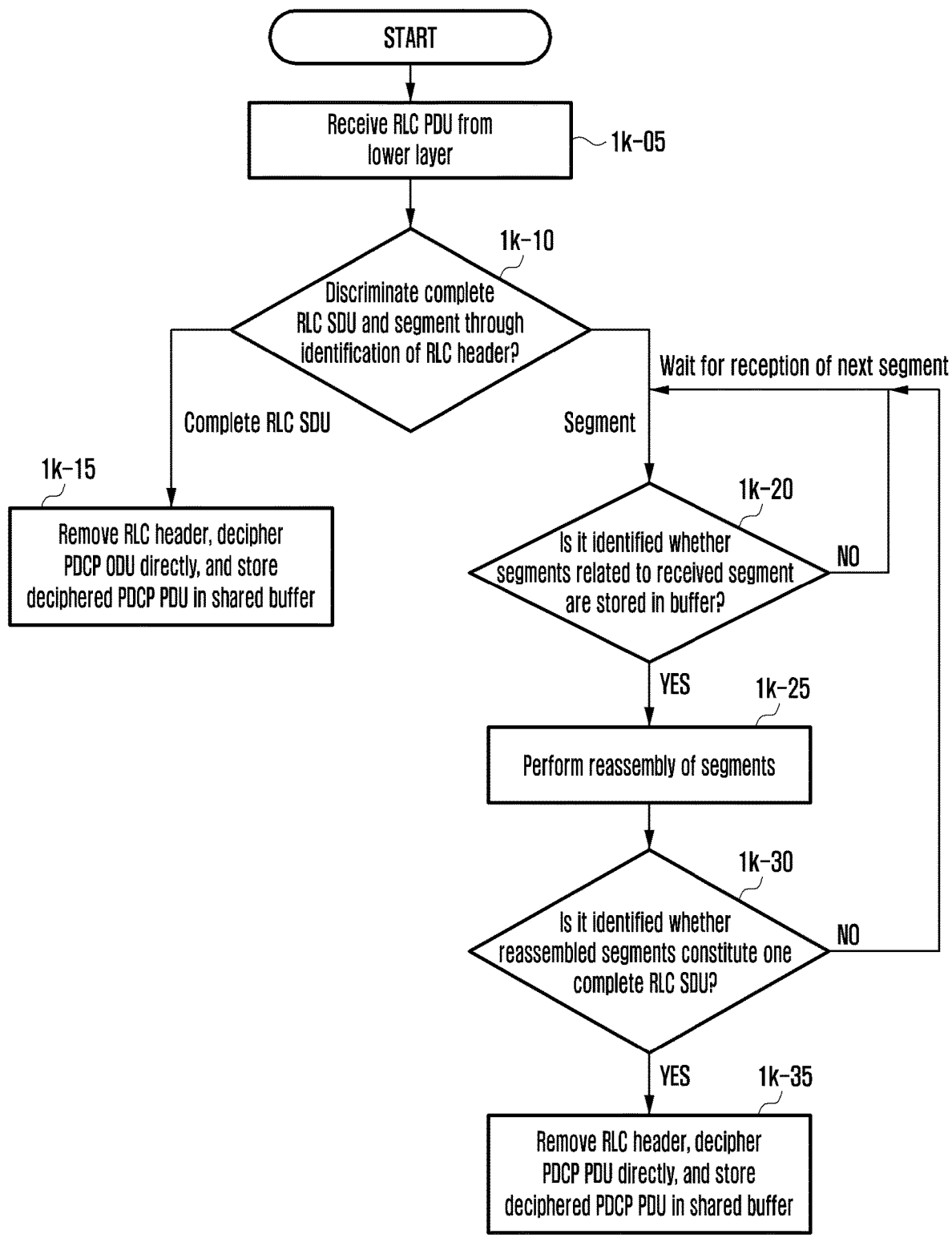
FIG. 11 is a flowchart of a method of a terminal with respect to an out-of-sequence deciphering method in which a terminal of a next-generation mobile communication system can accelerate data processing according to an embodiment of the present disclosure.

FIG. 11 is a flowchart of a method of an operation of a terminal with respect to an out-of-sequence deciphering method in which a terminal of a next-generation mobile communication system may accelerate data processing according to an embodiment of the present disclosure.

Referring to FIG. 11, a downlink in which a terminal receives data in the next-generation mobile communication system is provided. In a downlink scenario, the terminal receives data, and at operation 1k-05 the device that performs the RLC layer operation receives RLC PDUs from the device that performs the MAC layer operation.

In a downlink scenario, a terminal may receive data, and the device that performs the RLC layer operation may receive RLC PDUs from the device that performs the MAC layer operation. in an embodiment of the present disclosure, the device that performs the PDCP layer operation and the device that performs the RLC layer operation do not use independent buffers as illustrated in FIGS. 7 and 8, but use one shared buffer. That is, the device that performs the PDCP layer operation and the device that performs the RLC layer operation may share one buffer (e.g., a flash memory).

If the RLC PDUs are received from the device that performs the MAC layer operation, the terminal, at operation 1k-10, analyzes the RLC headers of the received RLC PDUs, determines the sequence numbers of the RLC PDUs, and identifies segment information related RLC header fields to identify whether the received RLC PDU is a complete RLC PDU (or complete RLC SDU) or a segment. If the RLC PDU is identified. as a complete RLC PDU at operation 1k-10, the method proceeds to operation 1k-15, otherwise the method proceeds to operation 1k-20.

If the RLC PDUs are the complete RLC PDUs as described above, the device that performs the RLC layer operation removes the RLC headers and transfers the RLC PDUs to the device that performs the PDCP layer operation at operation 1k-15. The device that performs the PDCP layer operation may decipher the RLC SDU (PDCP PDU) and may directly store the deciphered RLC SDU (PDCP PDU) in the shared buffer. That is, the procedures before storing the RLC SDU (PDCP PDU) may be performed on a DRAM of the terminal. Further, if a speed at which the MAC device transfers the RLC PDU to the RLC device is greater than a speed at which one RLC PDU is received, the RLC header is analyzed and removed from the received RLC PDU, and the RLC SDU (PDCP PDU) is deciphered and stored in the shared buffer, where the above-described procedures may be performed in parallel with respect to the RLC SDUs.

At operation 1k-10, if the RLC PDU does not include the complete RLC SDU, but includes only a segment of the RLC SDU when the device that performs the RLC layer operation receives the RLC PDU from the device that performs the MAC layer operation and analyzes the RLC header, the RLC SDU corresponding to the segment is not transferred to the device that performs the PDCP layer operation. Accordingly, the device that performs the PDCP layer operation does not perform deciphering.

At operation 1k-20, the device that performs the RLC layer operation identifies whether related segments exist in the buffer. If the related segments do not exist n the buffer, the device may wait for the reception of the next segments. If the related segments exist in the buffer, the device proceeds to operation 1k-25 to perform reassembly of the segments. If the complete RLC SDU is not formed as the result of the reassembly, the device may store the segments in the buffer. Thereafter, if the remaining segments of the complete RLC SDU are received, the device that performs the RLC layer operation may configure one complete RLC SDU through reassembly of the received segments.

At operation 1k-30, the device that performs the RLC layer operation identities whether the reassembled segments form a complete RLC SDU or a complete RLC PDU. If the reassembled segments form the complete RLC SDU, the device proceeds to operation 1k-35. At operation 1k-35, the device that performs the RLC layer operation removes the header from the PDU and transfers the RLC SDU to the device that performs the PDCP layer operation, and the device that performs the PDCP layer operation may remove the PDCP header from the PDCP PDU, decipher a data packet, and store the deciphered data packet in the buffer.

If it is determined that the RLC SDU is a segment through analysis of the RLC header as described above, reassembly of the segments is performed to form the complete RLC SDU after all the segments are received, and then deciphering is performed. As described above, the identification of whether the RLC SDU is a segment, through the RLC header may be determined, for example, in view of RLC header fields related to segmentation information. That is, in an embodiment of the present disclosure, the RLC SDU may be provided to the device that performs the PDCP layer operation regardless of the sequence number of the RLC PDU or RLC SDU. However, if the RLC PDU or RLC SDU is a segment, the RLC PDU or RLC SDU is unable to be provided to the device that performs the PDCP layer operation until the segments are reassembled to form the complete RLC PDU or the complete RLC SDU.

Figure 12:
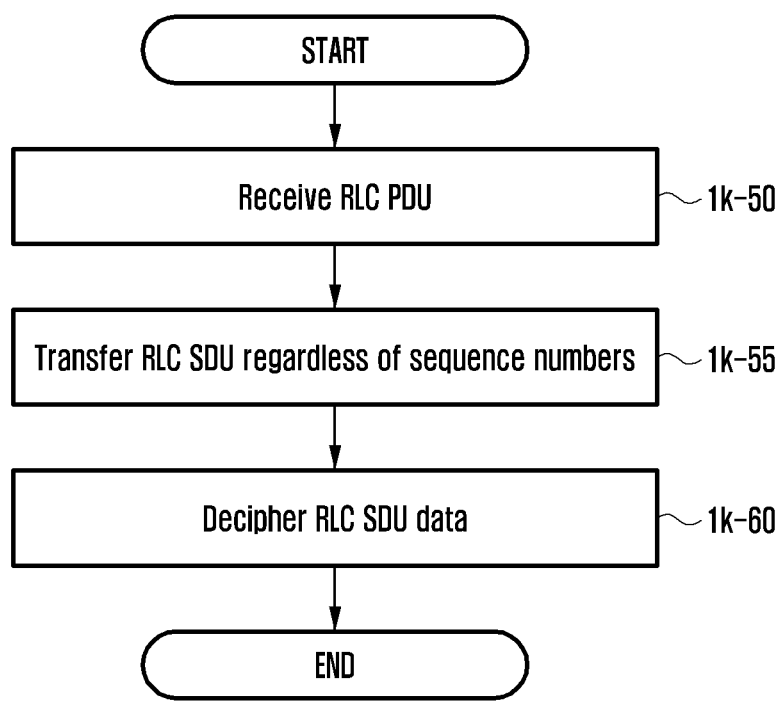
FIG. 12 is a flowchart of a method of a reception device according to an embodiment of the present disclosure.

FIG. 12 is a flowchart of an operation of a reception device according to an embodiment of the present disclosure.

Referring to FIG. 12, at operation 1k-50, a reception device may receive an RLC PDU. An RLC layer of the reception device may receive a PDU. A device that performs an RLC layer operation may receive the RLC PDU from a device that performs the MAC layer operation. The device that performs the RLC layer operation may analyze an RLC header of the received RLC PDU, and may identify the RLC PDU number or a sequence number from the RLC header. The device that performs the RLC layer operation may store an RLC SDU that is obtained by removing the RLC header from the RLC PDU in a buffer. The buffer may be an RLC buffer or a shared buffer.

At operation 1k-55. the RLC SDU may be transferred from the RLC layer to the PDCP layer. The device that performs the RLC layer operation may transfer the RLC SDU to the device that performs the PDCP layer operation. The RLC SDU conceptually corresponds to the PDCP PDU. In an embodiment of the present disclosure, the device that performs the RLC layer operation may transfer the RLC SDU. If an out-of-sequence RLC SDU is received, the device that performs the RLC layer operation may process the RLC SDU according to an embodiment of the present disclosure. The device that performs the RLC layer operation may simultaneously transfer in-sequence RLC SDUs to the PDCP layer. The device that performs the RIX layer operation may transfer the RLC SDU to the PDCP layer regardless of the number of the RLC SDU. The device that performs the RLC layer operation may operate a shared buffer with the device that performs the PDCP layer operation. On the other hand, if the RLC SDU received by the device that performs the RIX layer operation is not a complete RLC SDU, but is a segment of the RLC SDU, the device that performs the RLC layer operation may not transfer the RLC SDU to the device that performs the PDCP layer operation until reassembly is performed to form the complete RLC SDU.

At operation 1k-60, the device that performs the PDCP layer operation may receive the RLC SDU from the device that performs the RLC layer operation. The PDCP layer construes the RLC SDU as the PDCP PDU. The device that performs the PDCP layer operation may decipher the PDCP PDU. The device that performs the PDCP layer operation may analyze and remove the PDCP header, and decipher the PDCP SDU packet. The device that performs the PDCP layer operation may store the deciphered data packet in the PDCP buffer. In the case of using a shared buffer, the device may store the deciphered data packet in the shared buffer. The device that performs the PDCP layer operation may decipher the data included in the received RLC SDU regardless of the RLC SDU number or the sequence number.

Through the above-described method, since the RLC SDU may be rapidly transferred up to the PDCP layer and rapid deciphering is possible even in the PDCP layer, the data deciphering and the reception speed may be improved.

The respective operations may be or may not be performed in accordance with certain conditions, and the conditions may be the same as those described above FIG. 13 is a block diagram of certain scenarios.

Figure 13:
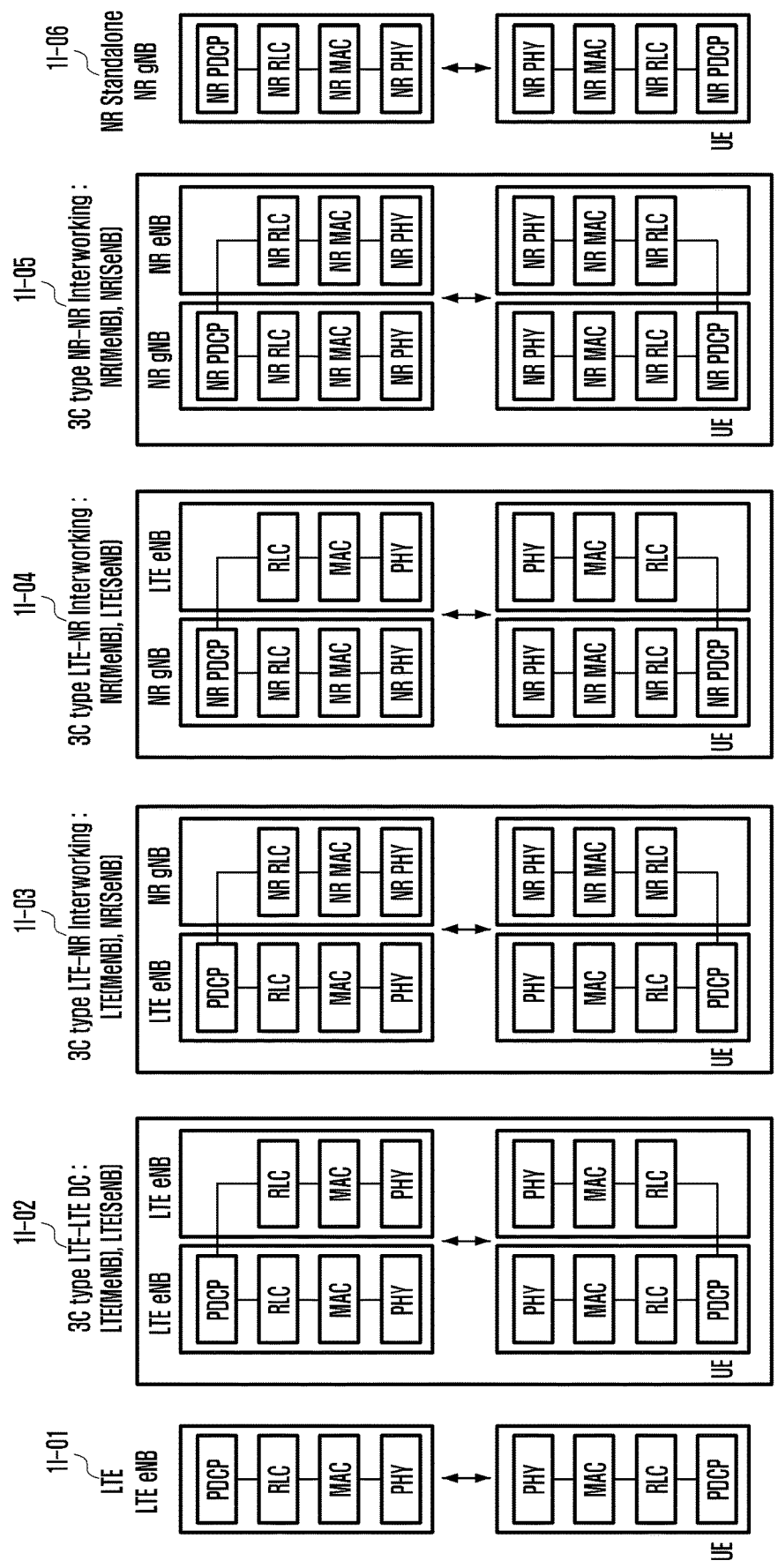
FIG. 13 is a block diagram of scenarios.

Referring to FIG. 13, 1*l*-01 is a scenario in which a terminal receives a service from an LTE base station, and 1*l*-02 is a scenario in which a terminal receives a service through dual connectivity between LTE base stations. In addition, 1*l*-03 is a scenario in which in tri-band carrier aggregation or 3C type operation between an LTE base station and an NR base station, the LTE base station is a master cell group (MCG), and the NR base station is a secondary cell group (SCG), and 1*l*-04 indicates a scenario in which in 3C type operation between an LTE base station and an NR base station, the NR base station is an MCG, and the LTE base station is an SCG. Further, 1*l*-05 is a scenario in which in 3C type operation between a first NR base station and a second NR base station, the first NR base station is an MCG, and the second NR base station is an SCG, and 1*l*-06 is a scenario in which a terminal receives a service from one NR base station. Even in scenarios such as 1*l*-01, 1*l*-02, 1*l*-03, 1*l*-04, 1*l*-05, and 1*l*-06, an embodiment or a combination of embodiments of the present disclosure described above may be applied to a data process for receiving a service from an LTE base station, an NR base station, or all base stations. Further, embodiments or a combination of embodiments are also applicable to various multi-connectivity scenarios.

Further, embodiments of the present disclosure are applicable to a transparent mode (TM), an unacknowledged mode (UM), and an acknowledged mode (AM).

Figure 14:
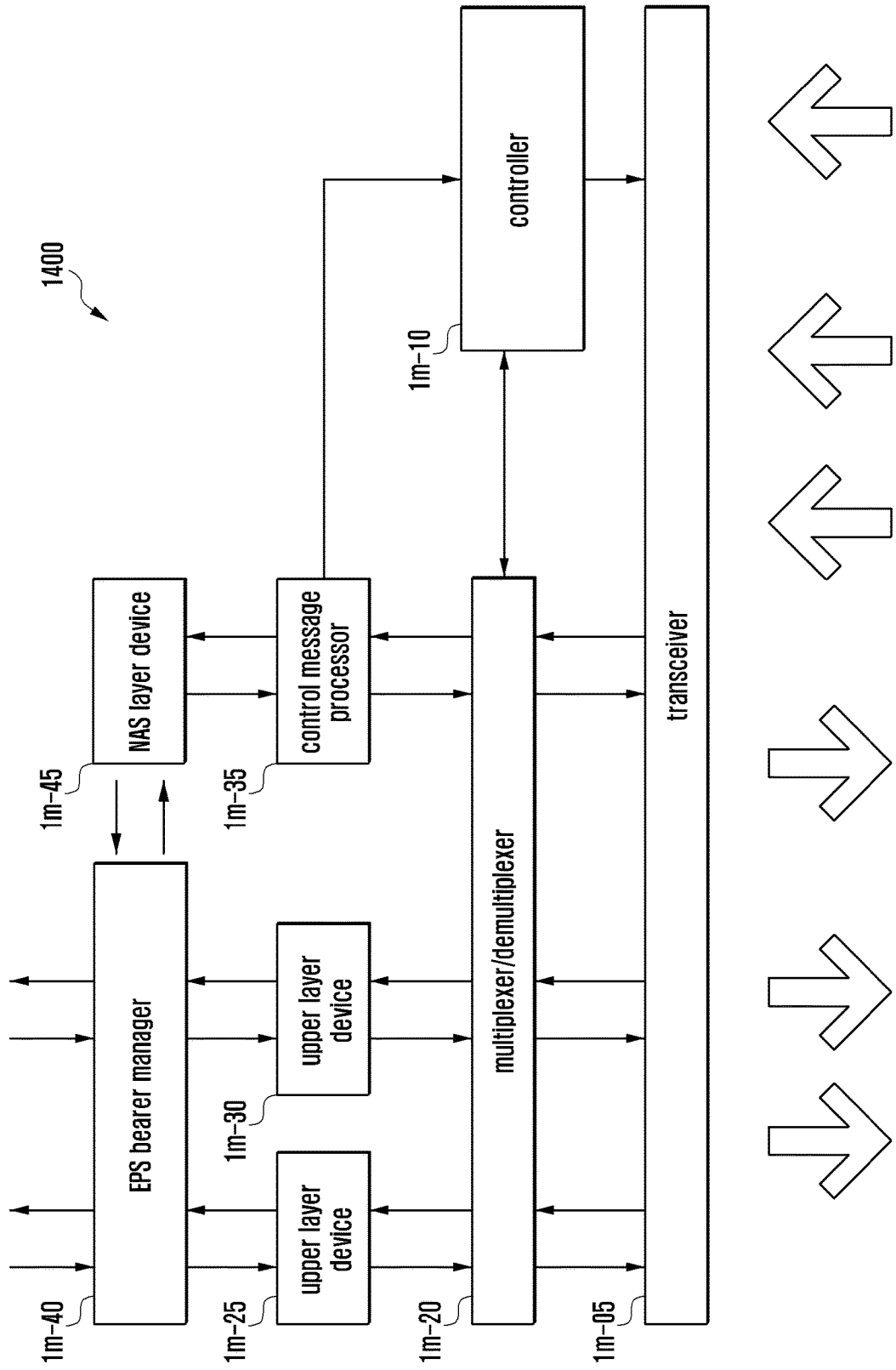
FIG. 14 is a block diagram of a terminal.

FIG. 14 is a block diagram of a terminal 1400 according to an embodiment of the present disclosure. Referring to FIG. 14, the terminal 1400 includes a transceiver 1*m*-05, a controller 1*m*-10, a multiplexer/demultiplexer 1*m*-20, a control message processor 35, various kinds of upper layer devices 1*m*-25 and 1*m*-30, an EPS bearer manager 1*m*-40, and a non-access stratum (NAS) layer device 1*m*-45.

The transceiver 1*m*-05 receives data and a certain control signal on a forward channel of a serving cell, and transits the data and the control signal on a backward channel. If a plurality of serving cells are configured, the transceiver 1*m*-05 performs data transmission/reception and control signal transmission/reception through the plurality of serving cells.

The multiplexer/demultiplexer 1*m*-20 serves to multiplex data generated by the upper layer devices 1*m*-25 and 1*m*-30 or the control message processor 1*m*-35, to demultiplex the data received through the transceiver 1*m*-05, and to properly transfer the multiplexed or demultiplexed data to the upper layer devices 1*m*-25 and 1*m*-30 or the control message processor 1*m*-35.

The control message processor 1*m*-35 is a radio resource control (RRC) layer device, and takes a necessary operation through processing a control message received from a base station. For example, if an RRC connection setup message is received, the control message processor 1*m*-35 sets signaling radio bearer 1 (SRB1) and temporary data radio bearer (DRB).

The upper layer device 1*m*-25 or 1*m*-30 indicates a DRB device, and may be configured for each service The upper layer device 1*m*-25 or 1*m*-30 processes data generated through a user service, such as a file transfer protocol (FTP) or VoIP, and transfers the processed data to the multiplexer/demultiplexer 1*m*-20, or processes data transferred from the multiplexer/demultiplexer 1*m*-20 and transfers the processed data to a service application of an upper layer. One service may be mapped onto one evolved packet system (EPS) bearer and one upper layer device in a one-to-one manner. If a certain EPS bearer uses a data transfer procedure (e.g., one of the embodiments of the present disclosure) of the present disclosure, the upper layer device 1*m*-25 or 1*m*-30 is not configured with respect to the corresponding EPS bearer.

The controller 1*m*-10 controls the transceiver 1*m*-05 and the multiplexer/demultiplexer 1*m*-20 to identify scheduling commands, for example, backward grants, received through the transceiver 1*m*-05 and perform backward transfer thereof as proper transfer resources at a proper time.

The EPS bearer manager determines whether to apply the data transfer procedure, and if such data transfer procedure is applied, it transfers an IP packet to the RRC layer device or the temporary DRB device.

Figure 15:
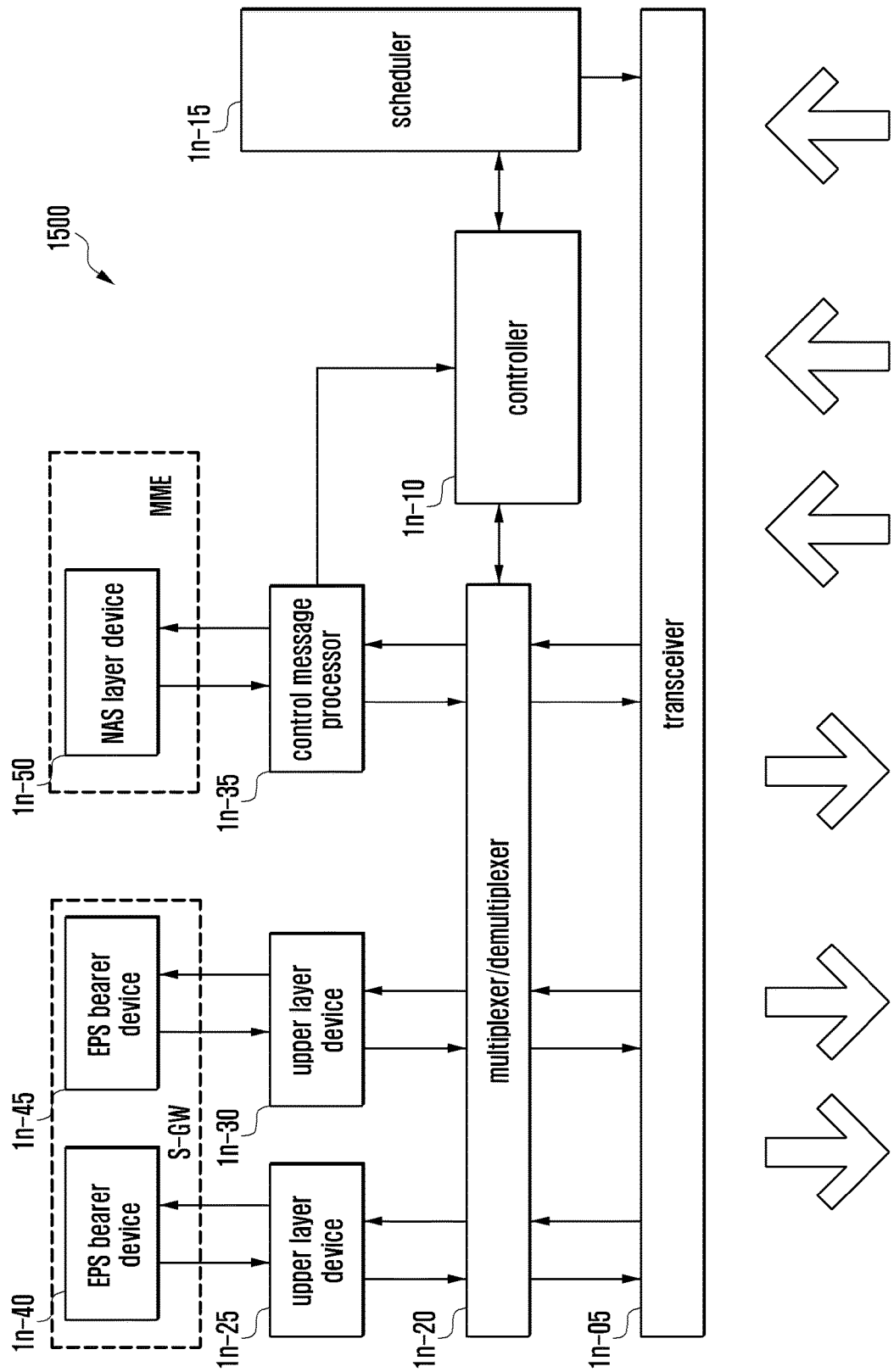
FIG. 15 is a block diagram of a wireless communication system.

FIG. 15 is a block diagram of a wireless communication system 1500.

Referring to FIG. 15, a block diagram of a base station, an MME, and an S-GW is illustrated. The base station includes a transceiver 1*n*-05, a controller 1*n*-10, a multiplexer/demultiplexer 1*n*-20, a control message processor 1*n*-35, various kinds of upper layer devices 1*n*-25 and 1*n*-30, a scheduler 1*n*-15, EPS bearer devices 1*n*-40 and 1*n*-45, and a NAS layer device 1*n*-50. The EPS bearer device is located in the S-GW, and the NAS layer device is located in the MME.

The transceiver 1*n*-05 transmits data and a certain control signal on a forward carrier, and receives the data and the control signal on a backward carrier. If a plurality of carriers are configured, the transceiver 1*n*-05 performs data transmission/reception and control signal transmission/reception on the plurality of carriers.

The multiplexer/demultiplexer 1*n*-20 serves to multiplex data generated by the upper layer devices 1*n*-25 and 1*n*-30 or the control message processor 1*n*-35, demultiplex the data received through the transceiver 1*n*-05, and properly transfer the multiplexed or demultiplexed data to the upper layer devices 1*n*-25 and 1*n*-30, the control message processor 1*n*-35, or the controller 1*n*-10. The control message processor 1*n*-35 may be configured for each EPS bearer, and configures the data transferred from the EPS bearer device as an RLC PDU to transfer the configured RLC PDU to the multiplexer/demultiplexer 1*n*-20 or configures the RLC PDU transferred from the multiplexer/demultiplexer 1*n*-20 as a PDCP SDU to transfer the configured PDCP SDU to the EPS bearer device.

The scheduler 1*n*-15 allocates a transfer resource to the terminal at a proper time in consideration of a buffer state and a channel state of the terminal, and controls the transceiver to process a signal transmitted by the terminal or to transmit the signal to the terminal.

The EPS bearer device 1*n*-40 or 1*n*-45 is configured for each EPS bearer, and processes data transferred from the upper layer device to transfer the processed data to a next network node.

The upper layer device 1*n*-25 or 1*n*-30 and the EPS bearer device 1*n*-40 are mutually connected by an S1-U bearer. The upper layer device 1*n*-25 and 1*n*-30 corresponding to a common DRB is connected by the EPS bearer for the common DRB and a common S1-U bearer.

The NAS layer device 1*n*-50 processes an IP packet provided in a NAS message to transfer the processed IP packet to the S-GW.

Figure 16:
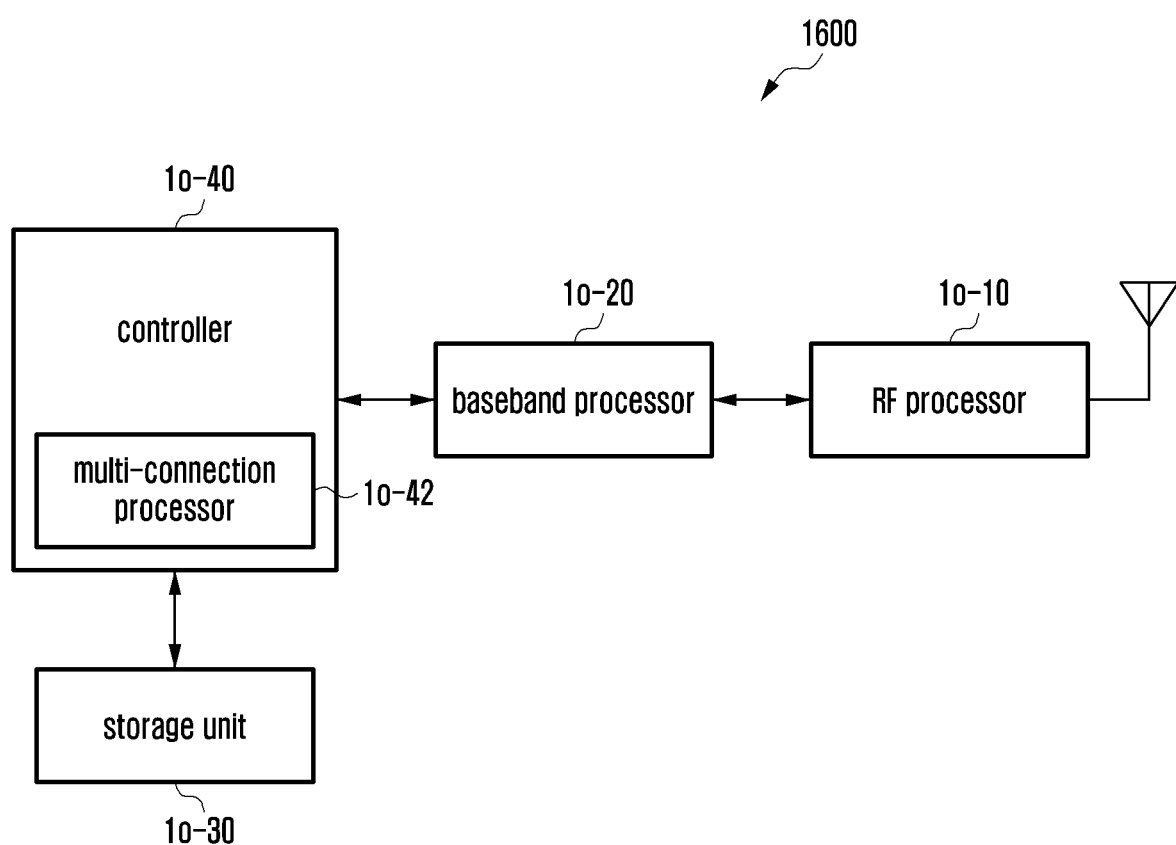
FIG. 16 is a block diagram of a terminal.

FIG. 16 is a block diagram of a terminal 1600.

Referring to FIG. 16, the terminal 1600 includes a radio frequency (RF) processor 1*o*-10, a baseband processor 1*o*-20, a storage unit 1*o*-30, and a controller 1*o*-40. The terminal 1600 may be composed of a controller 1*o*-40 and a transceiver. In this case, the controller 1*o*-40 may include at least one processor.

The RF processor 1*o*-10 performs a function for transmitting and receiving a signal on a radio channel, such as signal band conversion and amplification. That is, the RF processor 1*o*-10 performs up-conversion of a baseband signal provided from the baseband processor 1o-20 into an RF-band signal to transmit the converted signal to an antenna, and performs down-conversion of the RF-band signal received through the antenna into a baseband signal. For example, the RF processor 1o-10 may include a transmission filter, a reception filter, an amplifier, a mixer, an oscillator, a digital-to-analog converter (DAC), and an analog-to-digital converter (ADC). Although only one antenna is illustrated in FIG. 16, the terminal 1600 may be provided with a plurality of antennas. Further, the RF processor 1o-10 may include a plurality of RF chains. Further, the RF processor 1o-10 may perform beamforming. For beamforming, the RF processor 1o-10 may adjust phases and sizes of signals transmitted or received through the plurality of antennas or antenna elements. Further, the RF processor 1o-10 may perform MIMO, and may receive several layers during the performance of a MIMO operation. The RF processor 1o-10 may perform reception beam sweeping through a proper configuration of a plurality of antennas or antenna elements under the control of the controller 1o-40, or may control the direction and the beam width of the reception beam so that the reception beam is synchronized with the transmission beam. The baseband processor 1o-20 performs conversion between a baseband signal and a bit string in accordance with a physical layer standard of the system. For example, during data transmission, the baseband processor 1o-20 generates complex symbols by encoding and modulating a transmitted bit string. Further, during data reception, the baseband processor 1o-20 restores a received bit string by demodulating and decoding the baseband signal provided from the RF processor 1o-10. For example, in the case of following an OFDM method, during data transmission, the baseband processor 1o-20 generates complex symbols by encoding and modulating a transmitted bit string, performs mapping of the complex symbols on subcarriers, and then configures OFDM symbols through an inverse fast Fourier transform (IFFT) operation and cyclic prefix (CP) insertion. Further, during data reception, the baseband processor 1o-20 divides the baseband signal provided from the RF processor 1o-10 in the unit of OFDM symbols, restores the signals mapped on the subcarriers through a fast Fourier transform (FTT) operation, and then restores the received bit string through demodulation and decoding.

The baseband processor 1o-20 and the RF processor 1o-10 transmit and receive the signals as described above. Accordingly, the baseband processor 1o-20 and the RF processor 1o-10 may be referred to as a transmitter, a receiver, a transceiver, or a communication unit. Further, in order to support different radio connection technologies, at least one of the baseband processor 1o-20 and the RF processor 1o-10 may include a plurality of communication modules. Further, in order to process signals of different frequency bands, at least one of the baseband processor 1o-20 and the RF processor 1o-10 may include different communication modules. For example, the different radio connection technologies may include an LTE network and an NR network. Further, the different frequency bands may include super high frequency (SHF) (e.g., 2.5 GHz or 5 GHz) band and millimeter wave (mmWave) (e.g., 60 GHz) band.

The storage unit 1o-30 stores a basic program for an operation of the terminal 1600, application programs, and data of configuration information. The storage unit 1o-30 provides stored data in accordance with a request from the controller 1o-40.

The controller 1o-40 controls the entire operation of the terminal 1600. For example, the controller 1o-40 transmits and receives signals through the baseband processor 1o-20 and the RF processor 1o-10. Further, the controller 1o-40 records or reads data in or from the storage unit 1o-30. For this, the controller 1o-40 may include at least one multi-connection processor 10-42. For example, the controller 1o-40 may include a communication processor that performs a control for communication and an application processor controlling an upper layer, such as an application program.

In an embodiment of the present disclosure, the controller 1o-40 may be a device that performs operations of respective layers, such as a PDCP layer, an RLC layer, and a MAC layer, and may include at least one of a processor, a processing unit, and a processing module that perform respective layer operations. In an embodiment of the present disclosure, expressions of a device that performs a PDCP layer operation, a device that performs an RLC layer operation, a device that performs a MAC layer operation, and a device that performs a PHY layer operation have been used. However, the present disclosure is not intended to be limited thereto. Accordingly, the devices that perform the operations of the respective layers may be independent entities or entities that perform two or more layer operations. Although the operations of the respective layers may be logically discriminated, the controller 1o-40 may control the operations of the respective logical layers.

In an embodiment of the present disclosure, the controller 1o-40 may operate to receive an RLC PDU, to transfer an RLC SDU acquired from the RLC PDU from the RLC layer to the PDCP layer regardless of the RLC PDU number, and to decipher the RLC SDU. Further, the controller 1o-40 may operate to transfer the RLC PDU to the PDCP layer even if the RLC PDU number is not in sequence with the preprocessed RLC PDU number.

Further, the controller 1o-40 may operate to remove the RLC header of the RLC PDU, to store the RLC SDU in a buffer, and to transfer the RLC SDU stored in the buffer to the PDCP layer even if the number of the RLC SDU stored in the buffer is not in sequence with the number of the preprocessed RLC SDU. Further, if the RLC SDU is transferred, the controller 1o-40 may operate to decipher the PDCP PDU regardless of the number of the PDCP PDU acquired from the RLC SDU.

Further, the controller 1o-40 may operate to determine whether the RLC SDU is a complete RLC SDU or a segment of the RLC SDU, and if the RLC SDU is not a complete RLC SDU, it may operate not to transfer the RLC SDU to the PDCP layer. Further, if the RLC SDU is a segment of the RLC SDU, the controller 1o-40 may operate to determine whether a second RLC SDU related to the RLC SDU is stored in the buffer.

Further, if the second RLC SDU is stored, the controller 1o-40 may operate to combine the RLC SDU and the second RLC SDU to transfer the combined RLC SDUs to the PDCP layer, whereas if the second RLC SDU is not stored, the controller may operate to wait for reception of the second RLC SDU.

Further, if the RLC SU that is in sequence with the RLC SDU is stored in the buffer, the controller 1o-40 may operate to simultaneously transfer the RLC SDU and the RLC SDU that is in sequence with the RLC SDU to the PDCP layer.

Further, the controller 1o-40 may operate so that the RLC layer and the PDCP layer use a shared buffer.

Figure 17:
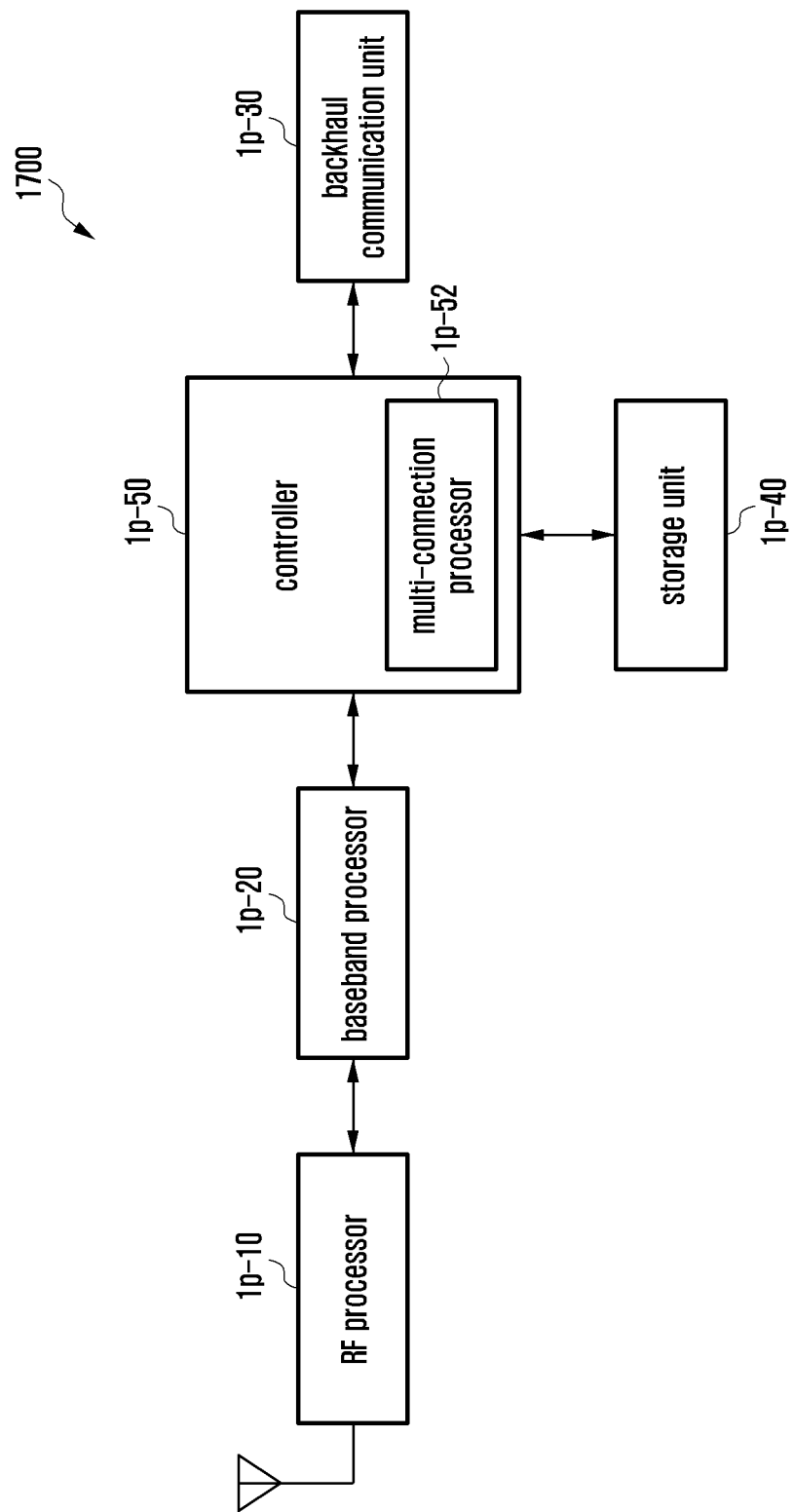
FIG. 17 is a block diagram of a base station in another wireless communication system.

FIG. 17 is a block diagram of a base station 1700 in a wireless communication system.

Referring to FIG. 17, the base station 1700 includes an RF processor 1p-10, a baseband processor 1p-20, a backhaul communication unit 1p-30, a storage unit 1p-40, and a controller 1p-50.

The RF processor 1p-10 performs a function for transmitting and receiving a signal on a radio channel, such as signal band conversion and amplification. That is, the RF processor 1p-10 performs up-conversion of a baseband signal provided from the baseband processor 1p-20 into an RF-band signal to transmit the converted signal to an antenna, and performs down-conversion of the RF-band signal received through the antenna into a baseband signal. For example, the RF processor 1p-10 may include a transmission filter, a reception filter, an amplifier, a mixer, an oscillator, a DAC, and an ADC. Although only one antenna is illustrated in FIG. 17, the first connection node may be provided with a plurality of antennas. Further, the RF processor 1p-10 may include a plurality of RF chains. Further, the RF processor 1p-10 may perform beamforming. For the beamforming, the RF processor 1p-10 may adjust phases and sizes of signals transmitted or received through the plurality of antennas or antenna elements. Further, the RF processor 1p-10 may perform down MIMO operation through transmission of one or more layers.

The baseband processor 1p-20 performs conversion between a baseband signal and a bit string in accordance with a physical layer standard of the first radio connection technology. For example, during data transmission, the baseband processor 1p-20 generates complex symbols by encoding and modulating a transmitted bit string. Further, during data reception, the baseband processor 1p-20 restores a received bit string by demodulating and decoding the baseband signal provided from the RF processor 1p-10. For example, in the case of following an OFDM method, during data transmission, the baseband processor 1p-20 generates complex symbols by encoding and modulating a transmitted bit string, performs mapping of the complex symbols on subcarriers, and then configures OFDM symbols through the IFFT operation and CP insertion. Further, during data reception, the baseband processor 1p-20 divides the baseband signal provided from the RF processor 1p-10 in the unit of OFDM symbols, restores the signals mapped on the subcarriers through the FFT operation, and then restores the received bit string through demodulation and decoding. The baseband processor 1p-20 and the RF processor 1p-10 transmit and receive the signals as described above. Accordingly, the baseband processor 1p-20 and the RF processor 1p-10 may be referred to as a transmitter, a receiver, a transceiver, a communication unit, or a wireless communication unit.

The backhaul communication unit 1p-30 provides an interface for that performs communication with other nodes in the network.

The storage unit 1p-40 stores therein a basic program for an operation of the main base station 1700, application programs, and data of configuration information, In particular, the storage unit 1p-40 may store information on a bearer allocated to the connected terminal and the measurement result reported from the connected terminal. Further, the storage unit 1p-40 may store information that becomes a basis of determination whether to provide or suspend a multi-connection to the terminal. Further, the storage unit 1p-40 provides stored data in accordance with a request from the controller 1p-50.

The controller 1p-50 controls the whole operation of the main base station 1700. For example, the controller 1p-50 transmits and receives signals through the baseband processor 1p-20 and the RF processor 1p-10 or through the backhaul communication unit 1p-30. Further, the controller 1p-50 records or reads data in or from the storage unit 1p-40. For this, the controller 1p-50 may include at least one multi-connection processor 1p-52.

In an embodiment of the present disclosure, the controller 1p-50 may be a device that performs operations of respective layers, such as a PDCP layer, an RLC layer, and a MAC layer, and may include at least one of a processor, a processing unit, and a processing module that perform respective layer operations. In an embodiment of the present disclosure, a device that performs a PDCP layer operation, a device that performs an RLC layer operation, a device that performs a MAC layer operation, and a device that performs a PEW layer operation have been used. However, the present disclosure is not intended to be limited thereto. Accordingly, the devices that perform the operations of the respective layers may be independent entities or entities that perform two or more layer operations. Although the operations of the respective layers may be logically discriminated, the controller 1p-50 may control the operations of the respective logical layers.

In an embodiment of the present disclosure, since the operation of the base station 1700 as the reception device corresponds to the operation of the terminal 1600 as the reception device, the controller 1p-50 of the base station 1700 performs the same operation as the operation of the terminal controller 1o-40 as described above with reference to FIG. 16.

Although embodiments of the present disclosure have been described above with reference to the accompanying drawings and certain terms have been used, these are merely used as examples to assist those of ordinary skill in the art to gain a comprehensive understanding of the present disclosure, but are not intended to limit the scope of the present disclosure. It will be apparent to those of ordinary skill in the art to which the present disclosure pertains that various modifications are possible based on the present disclosure in addition to the embodiments disclosed herein without departing from the scope of the present disclosure as defined by the appended claims and their equivalents.

What is claimed is:

1. A method performed by a terminal, the method comprising:
   receiving a radio link control (RLC) packet data unit (PDU) associated with a bearer;
   identifying whether an RLC service data unit (SDU) obtained from the RLC PDU is a complete RLC SDU or a segment of the complete RLC SDU;
   in case that an out of order delivery is configured for an RLC entity associated with the bearer:
      as a response to determining that the first RLC SDU is identified as the complete RLC SDU, transferring a first RLC SDU acquired from the RLC PDU from the RLC entity to a packet data convergence protocol (PDCP) entity regardless of an order of a sequence number of the RLC PDU;
   performing a reordering function based on a PDCP PDU obtained from the first RLC SDU, in case that the PDCP entity is associated with the RLC entity configured with the out of order delivery; and
   receiving, another RLC PDU associated with the bearer, wherein the reordering function based on the PDCP PDU obtained from the first RLC SDU is not performed in case that the PDCP entity is associated with the RLC entity not configured with the out of order delivery.

2. The method of claim 1, further comprising:
deciphering the first RLC SDU for the PDCP PDU; and
removing a PDCP header of the PDCP PDU.

3. The method of claim 1, further comprising:
prohibiting a transfer of a second RLC SDU acquired from the RLC PDU from the RLC entity to the PDCP entity regardless of the sequence number of the RLC PDU as a response to determining that the second RLC SDU is identified as a segment of the complete RLC SDU.

4. The method of claim 1, wherein the RLC PDU is associated with a reliable low latency communication service.

5. The method of claim 1, wherein:
the first RLC SDU acquired from the RLC PDU is transferred to the PDCP entity even if the sequence number of the RLC PDU is not in sequence with a sequence number of a preprocessed RLC PDU; and
in case that the first RLC SDU is transferred, the PDCP PDU is deciphered regardless of a sequence number of a PDCP PDU acquired from the first RLC SDU.

6. The method of claim 1, further comprising:
in case that the out of order delivery is not configured for the RLC entity associated with the bearer:
transferring the first RLC SDU acquired from the RLC PDU from the RLC entity to the PDCP entity regardless based on the order of a sequence number of the RLC PDU even if the first RLC SDU is identified as the complete RLC SDU.

7. The method of claim 1, wherein whether the RLC SDU is the complete RLC SDU or the segment of the complete RLC SDU is identified based on a segment information field of a header of the RLC PDU.

8. The method of claim 1, wherein:
in case that the second RLC SDU is the segment of the complete RLC SDU, the second RLC SDU is not transferred to the PDCP entity until the second RLC SDU is combined for the complete RLC SDU; and
whether a third RLC SDU related to the second RLC SDU is stored in a buffer is determined, in case that the second RLC SDU is the segment of the complete RLC SDU.

9. The method of claim 1, wherein the RLC entity and the PDCP entity use one shared buffer.

10. A terminal comprising:
a transceiver; and
a controller coupled with the transceiver and configured to:
receive a radio link control (RLC) packet data unit (PDU) associated with a bearer;
identify whether an RLC service data unit (SDU) obtained from the RLC PDU is a complete RLC SDU or a segment of the complete RLC SDU;
in case that an out of order delivery is configured for an RLC entity associated with the bearer:
as a response to determining that the first RLC SDU is identified as the complete RLC SDU, transfer a first RLC SDU acquired from the RLC PDU from the RLC entity to a packet data convergence protocol (PDCP) entity regardless of an order of a sequence number of the RLC PDU;
perform a reordering function based on a PDCP PDU obtained from the first RLC SDU, in case that the PDCP entity is associated with the RLC entity configured with the out of order delivery; and
receive another RLC PDU associated with the bearer, wherein the reordering function based on the PDCP PDU obtained from the first RLC SDU is not performed in case that the PDCP entity is associated with the RLC entity not configured with the out of order delivery.

11. The terminal of claim 10, wherein the controller is further configured to:
decipher the first RLC SDU for the PDCP PDU; and
remove a PDCP header of the PDCP PDU.

12. The terminal of claim 10, wherein the controller is further configured to prohibit a transfer of a second RLC SDU acquired from the RLC PDU from the RLC entity to the PDCP entity regardless of the sequence number of the RLC PDU as a response to determining that the second RLC SDU is identified as a segment of the complete RLC SDU.

13. The terminal of claim 10, wherein the RLC PDU is associated with a reliable low latency communication service.

14. The terminal of claim 10, wherein:
the first RLC SDU acquired from the RLC PDU is transferred to the PDCP entity even if the sequence number of the RLC PDU is not in sequence with a sequence number of a preprocessed RLC PDU; and
in case that the first RLC SDU is transferred, the PDCP PDU is deciphered regardless of a sequence number of a PDCP PDU acquired from the first RLC SDU.

15. The terminal of claim 10, in case that the out of order delivery is not configured for the RLC entity associated with the bearer:
wherein the controller is further configured to transfer the first RLC SDU acquired from the RLC PDU from the RLC entity to the PDCP entity regardless based on the order of a sequence number of the RLC PDU even if the first RLC SDU is identified as the complete RLC SDU.

16. The terminal of claim 10, wherein whether the RLC SDU is the complete RLC SDU or the segment of the complete RLC SDU is identified based on a segment information field of a header of the RLC PDU.

17. The terminal of claim 10, wherein:
in case that the second RLC SDU is the segment of the complete RLC SDU, the second RLC SDU is not transferred to the PDCP entity until the second RLC SDU is combined for the complete RLC SDU; and
whether a third RLC SDU related to the second RLC SDU is stored in a buffer is determined, in case that the second RLC SDU is the segment of the complete RLC SDU.

18. The terminal of claim 10, wherein the RLC entity and the PDCP entity use one shared buffer.

* * * * *